United States Patent
Sakano et al.

(10) Patent No.: US 12,553,640 B2
(45) Date of Patent: Feb. 17, 2026

(54) AIR CONDITIONER

(71) Applicant: Brother Kogyo Kabushiki Kaisha, Nagoya (JP)

(72) Inventors: Yuji Sakano, Toyota (JP); Shigeki Yoshida, Toyoake (JP); Manabu Shirai, Nagoya (JP); Yusuke Ochiai, Kiyosu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 116 days.

(21) Appl. No.: 18/330,688

(22) Filed: Jun. 7, 2023

(65) Prior Publication Data

US 2023/0314020 A1 Oct. 5, 2023

Related U.S. Application Data

(63) Continuation of application No. PCT/JP2021/044429, filed on Dec. 3, 2021.

(30) Foreign Application Priority Data

Dec. 7, 2020 (JP) .................................. 2020-202865
Dec. 7, 2020 (JP) .................................. 2020-202866
(Continued)

(51) Int. Cl.
*F24F 12/00* (2006.01)
*B60H 1/03* (2006.01)
(Continued)

(52) U.S. Cl.
CPC ........... *F24F 12/006* (2013.01); *B60H 1/039* (2019.05); *B60H 1/3202* (2013.01);
(Continued)

(58) Field of Classification Search
CPC .. F24F 3/12–153; F24F 5/0035; F24F 12/006; B60H 1/039; B60H 1/3202
See application file for complete search history.

(56) References Cited

U.S. PATENT DOCUMENTS 3,938,694 A * 2/1976 Archuleta ............. F24F 5/0035
   138/158
4,312,819 A * 1/1982 Leyland ................... F28D 5/00
   261/36.1
(Continued)

FOREIGN PATENT DOCUMENTS

CN    1930427 A    3/2007
CN  202032709 U   11/2011
(Continued)

OTHER PUBLICATIONS

May 7, 2024—(JP) Notice of Reasons for Refusal—App 2022-073451.
(Continued)

*Primary Examiner* — Christopher R Zerphey
(74) *Attorney, Agent, or Firm* — Banner & Witcoff, Ltd.

(57) ABSTRACT

An air conditioner includes a housing having a first outlet and a second outlet, a first channel communicating with the first outlet, a second channel communicating with the second outlet, a sensible heat exchanger to exchange sensible heat between a first air flowing through the first channel and a second air flowing through the second channel, a first vaporization filter to cool the first air by latent heat of water and a second vaporization filter to cool the second air by latent heat of water. The first vaporization filter is disposed downstream of the sensible heat exchanger in a flow direction of the first air. The second vaporization filter is disposed upstream of the sensible heat exchanger in a flow direction of the second air.

13 Claims, 14 Drawing Sheets

(30) Foreign Application Priority Data

Dec. 7, 2020 (JP) ................................. 2020-202867
Dec. 7, 2020 (JP) ................................. 2020-202868

(51) Int. Cl.
| | |
|---|---|
| *B60H 1/32* | (2006.01) |
| *F24F 5/00* | (2006.01) |
| *F24F 8/10* | (2021.01) |
| *F24F 13/22* | (2006.01) |
| *B60H 1/00* | (2006.01) |

(52) U.S. Cl.
CPC ............. *F24F 5/0035* (2013.01); *F24F 8/10* (2021.01); *F24F 13/222* (2013.01); *B60H 1/00378* (2013.01); *F24F 2005/0025* (2013.01)

(56) References Cited

U.S. PATENT DOCUMENTS

| | | | | |
|---|---|---|---|---|
| 4,354,358 | A | | 10/1982 | Tatsuoka et al. |
| 4,380,910 | A | * | 4/1983 | Hood .................... F24F 1/0087 62/304 |
| 4,926,657 | A | * | 5/1990 | Bomar .................. F28D 15/046 62/311 |
| 5,453,223 | A | * | 9/1995 | Maisotsenko ......... F24F 5/0035 261/153 |
| 5,645,769 | A | | 7/1997 | Tamaru et al. |
| 6,176,305 | B1 | * | 1/2001 | Haglid .................. F28D 9/0081 165/250 |
| 6,237,354 | B1 | * | 5/2001 | Cromer ................. F24F 3/1417 62/93 |
| 6,367,277 | B1 | | 4/2002 | Kinkel |
| 7,273,516 | B2 | * | 9/2007 | Weidmann ................ F28D 5/00 261/153 |
| 8,516,839 | B2 | * | 8/2013 | Hakbijl .................. F24F 1/0007 62/304 |
| 2007/0214810 | A1 | | 9/2007 | Yabu et al. |
| 2008/0003940 | A1 | * | 1/2008 | Haglid ...................... F24F 3/14 454/228 |
| 2019/0145655 | A1 | | 5/2019 | Conrad |

FOREIGN PATENT DOCUMENTS

| | | |
|---|---|---|
| CN | 108332418 A | 7/2018 |
| CN | 210486647 U | 5/2020 |
| JP | S56-173926 A | 5/1980 |
| JP | S57-028937 A | 2/1982 |
| JP | S57-104034 A | 6/1982 |
| JP | S59-142339 A | 8/1984 |
| JP | H05-223308 A | 8/1993 |
| JP | H08-327085 A | 12/1996 |
| JP | H09-002053 A | 1/1997 |
| JP | H09-112946 A | 5/1997 |
| JP | H10-122590 | 5/1998 |
| JP | 2000-337655 A | 12/2000 |
| JP | 2001-091021 A | 4/2001 |
| JP | 2001-105845 A | 4/2001 |
| JP | 2006-337019 A | 12/2006 |
| JP | 2008-265664 A | 11/2008 |
| JP | 2013-200059 A | 10/2013 |
| JP | 2014-092338 A | 5/2014 |
| JP | 2015-059702 A | 3/2015 |
| KR | 20130013576 A | 2/2013 |

OTHER PUBLICATIONS

May 7, 2024—(JP) Notice of Reasons for Refusal—App 2020-202868.
May 7, 2024—(JP) Notice of Reasons for Refusal—App 2020-202866.
Jan. 25, 2022—International Search Report—Intl App PCT/JP2021/044429.
Jan. 18, 2022—(JP) Notice of Reasons for Refusal—App 2020-2028655.
Jan. 18, 2022—(JP) Notice of Reasons for Refusal—App 2020-202867.
Mar. 1, 2022—(JP) Notice of Reasons for Refusal—App 2020-202855.
Mar. 1, 2022—(JP) Notice of Reasons for Refusal—App 2020-202857.
Jun. 13, 2023—(WO) International Preliminary Report on Patentability—App PCT/JP2021/044429.
Jul. 9, 2024—(EP) Search Report—App 21903329.7.

* cited by examiner

AIR CONDITIONER

REFERENCE TO RELATED APPLICATIONS

This is a continuation application of International Application No. PCT/JP2021/044429 filed on Dec. 3, 2021, which claims priority from Japanese Patent Application No. 2020-202865 filed on Dec. 7, 2020, Japanese Patent Application No. 2020-202866 filed on Dec. 7, 2020, Japanese Patent Application No. 2020-202867 filed on Dec. 7, 2020 and Japanese Patent Application No. 2020-202868 filed on Dec. 7, 2020. The entire contents of the aforementioned applications are incorporated herein by reference.

BACKGROUND ART

A known evaporative cooling type air conditioner draws in air, lowers the temperature of the air by using the heat of vaporization of water, and blows out the cooled air (for example, Patent Literature 1). The air conditioner disclosed in Patent Literature 1 includes air blowing means disposed in a housing, a first channel communicating with an inlet and a first outlet to guide an airflow generated by the air blowing means to the first outlet, a second channel communicating with the inlet and a second outlet to guide an airflow generated by the air blowing means to the second outlet, vaporizing means disposed in the second channel for cooling air flowing through the second channel by heat of vaporization of water, and a heat exchanger to perform heat exchange between the airflow cooled by the vaporizing means in the second channel and the airflow flowing through the first channel. In the second channel provided with the vaporization means, the atomized water sprayed by the vaporization means and the air whose absolute humidity has increased by the vaporized water flow downstream of the vaporization means. The air having increased humidity is blown out as exhaust air from the second outlet which is an exit of the second channel. The airflow cooled by the heat exchanger and flowing through the first channel is blown out as supply air from the first outlet to a space to be air-conditioned.

In the air conditioner of Patent Literature 1, the air blown by the air blowing means and flowing through the second channel passes through tubes of the sensible heat exchanger, and the air blown by the air blowing means and flowing through the first channel passes around the tubes, whereby heat is exchanged between the air flowing through the second channel and the air flowing through the first channel.

DESCRIPTION

However, in the air conditioner of Patent Literature 1, the air to be supplied to the room is cooled only by heat exchange between the air that has passed through the vaporization means and the sensible heat exchanger, and therefore cannot be cooled efficiently.

The present invention has been made in view of such circumstances, and an object of the present invention is to provide an air conditioner capable of improving cooling capacity.

An air conditioner according to an aspect of the present disclosure includes a housing having a first outlet and a second outlet, a first channel communicating with the first outlet, a second channel communicating with the second outlet, a sensible heat exchanger to exchange sensible heat between first air flowing through the first channel and second air flowing through the second channel, a first vaporization filter to cool the first air by latent heat of water, and a second vaporization filter to cool the second air by latent heat of water, the first vaporization filter is disposed downstream of the sensible heat exchanger in a flow direction of the first air, and the second vaporization filter is disposed upstream of the sensible heat exchanger in a flow direction of the second air.

In this aspect, the air conditioner includes two channels of the first channel and the second channel, and the sensible heat exchanger to exchange sensible heat between first air and second air flowing in these channels. The air conditioner further includes the first vaporization filter and the second vaporization filter, the first air passing through the first vaporization filter is cooled by heat of vaporization of water permeating the first vaporization filter, and the second air passing through the second vaporization filter is cooled by heat of vaporization of water permeating the second vaporization filter. Since the second vaporization filter is provided upstream of the sensible heat exchanger in the flow direction of the second air, the second air having passed through the second vaporization filter is cooled by heat of vaporization and then flows into the sensible heat exchanger. The first air having flown into the sensible heat exchanger exchanges heat with the second air cooled by the second vaporization filter via the sensible heat exchanger, and is cooled. The first air that has flowed out of the sensible heat exchanger is further cooled by the first vaporization filter provided downstream of the sensible heat exchanger in the flow direction of the first air, and then blown out as supply air from the first outlet to the space to be air-conditioned. Thus, since the air conditioner cools the first air blown out to the space to be air-conditioned in two steps, the first air can be efficiently cooled, and the first air can be used to efficiently cool the space to be air-conditioned. The air conditioner includes the first channel and the second channel which are different from each other, the first vaporization filter is provided in the first channel, and the second vaporization filter is provided in the second channel. By using the first vaporization filter and the second vaporization filter as cold energy sources, the first air can be efficiently cooled. Of the first vaporization filter and the second vaporization filter, the first air blown out to the space to be air-conditioned as the supply air passes through the first vaporization filter, which can prevent an increase in the absolute humidity of the first air to cool the first air efficiently. The water for generating heat of vaporization is supplied to the first vaporization filter and the second vaporization filter, that is, the water for generating the heat of vaporization is not directly supplied to the sensible heat exchanger. Thus, water droplets can be prevented from remaining in the first path and the second path inside the sensible heat exchanger.

The cooling capacity of the air conditioner can be improved.

FIRST EMBODIMENT

Figure 1:
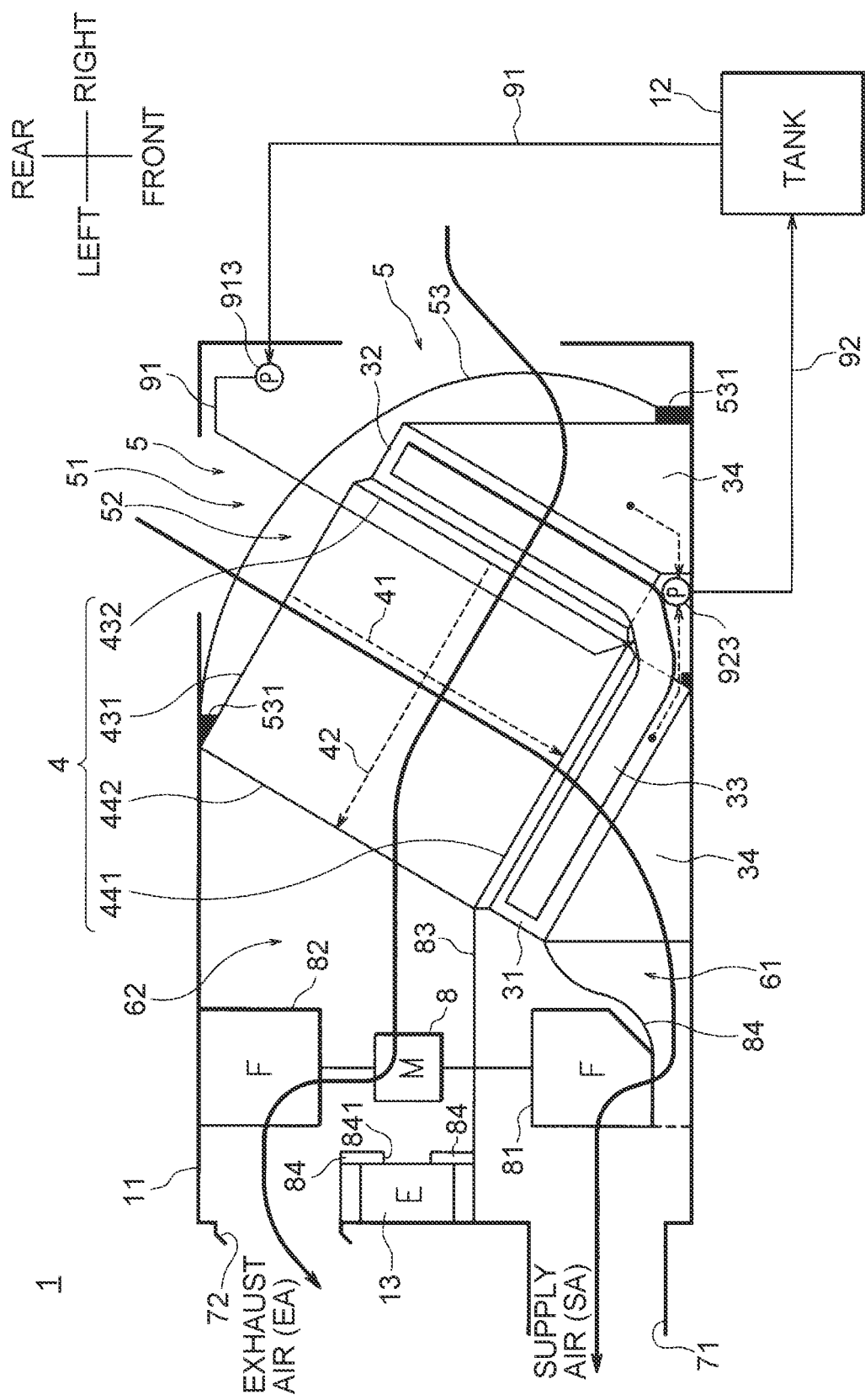
FIG. 1 is a schematic front view illustrating an air conditioner according to a first embodiment.
Figure 2:
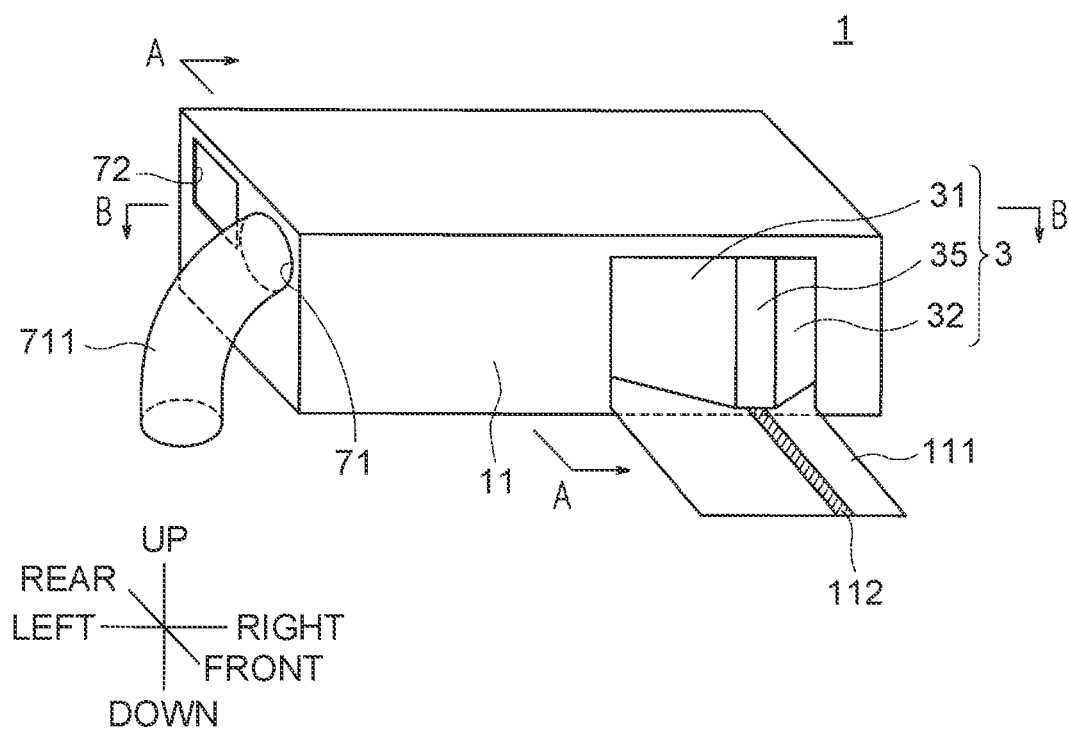
FIG. 2 is a perspective view illustrating an appearance of the air conditioner.

Hereinafter, an embodiment will be described with reference to the drawings. FIG. 1 is a schematic front view illustrating an air conditioner 1 according to a first embodiment. FIG. 2 is a perspective view illustrating an appearance of the air conditioner 1. FIG. 1 schematically shows a cross section taken along the line A-A in FIG. 2 from above. The air conditioner 1 includes a box-shaped housing 11 and a tank 12 configured as a separate body from the housing 11. For example, the air conditioner 1 is mounted on a moving object M such as a vehicle illustrated in FIG. 8 to cool a space around an operator in the moving object M as a space to be air-conditioned. The air conditioner 1 may be placed indoors such as in a factory. FIG. 1 illustrates the air conditioner 1 in a mounted state (front view, viewpoint from above). FIG. 2 is a perspective view of the air conditioner 1 in a normal mounted state.

The air conditioner 1 includes the tank 12 for storing water, and a cooling unit 3 including two vaporization filters that are a first vaporization filter 31 and a second vaporization filter 32. The air conditioner 1 uses the evaporation heat of water supplied from the tank 12 through the first vaporization filter 31 and the second vaporization filter 32 1 to lower the atmospheric temperature and provide cooling for the space to be air-conditioned, and is, for example, an evaporative cooling type air conditioner.

The cooling unit 3 includes the first vaporization filter 31, the second vaporization filter 32, a water supply part 33, and a drain pan 34. The water supply part 33 is provided above the first vaporization filter 31 and the second vaporization filter 32 to supply water to the first vaporization filter 31 and the second vaporization filter 32 below. The drain pan 34 receives water not vaporized at the first vaporization filter 31 and the second vaporization filter 32. Details of the cooling unit 3 will be described later.

The air conditioner 1 further includes a sensible heat exchanger 4, cools the first air in two steps, firstly by exchanging heat between the second air passing through the second vaporization filter 32 and the first air before passing through the first vaporization filter 31, and secondly by allowing the cooled first air to pass through the first vaporization filter 31. The first air is cooled by sensible heat exchanger without increasing the humidity, and then vaporized and cooled, whereby the first air cooled in two steps is blown out to the space to be air-conditioned as supply air SA. The second air is discharged to the outside of the housing 11 as exhaust air EA.

The housing 11 of the air conditioner 1 is provided with two inlets 5, a first outlet 71, and a second outlet 72. The inlets 5 are for taking in air in a space to be air-conditioned. The first outlet 71 is for blowing out first air as supply air, which is cooled in two steps by passing through the sensible heat exchanger 4 and the first vaporization filter 31, to the space to be air-conditioned. The second outlet 72 is for blowing out second air as exhaust air subjected to sensible heat exchange with the first air by passing through the second vaporization filter 32 and the sensible heat exchanger 4. The first outlet 71 and the second outlet 72 are provided on the left side surface of the housing 11.

The air conditioner 1 includes a fan for conveying first air and second air, and the fan includes a first fan 81 for conveying the first air and a second fan 82 for conveying the second air. The shapes of the first fan 81 and the second fan 82 in FIG. 1 are examples. The fan may be, for example, a centrifugal fan such as a sirocco fan, and a propeller fan. The first fan 81 is provided near the first outlet 71, and the second fan 82 is provided near the second outlet 72. That is, when, with respect to a flow of air of the air conditioner 1, the two inlets 5 are the most upstream end and the first outlet 71 and the second outlet 72 are the most downstream ends, the first fan 81 and the second fan 82 are provided downstream of the sensible heat exchanger 4 and the cooling unit 3 in a flow direction of air. The first fan 81 and the second fan 82, which are provided downstream, function as suction fans and maintain the insides of air flow channels in the air conditioner 1 under negative pressure. By maintaining the insides of the air flow channels under negative pressure, absorption of water from the water supply part 33 into the first vaporization filter 31 and the second vaporization filter 32 is promoted. In the present embodiment, dripping of water from the water supply part 33 to the first vaporization filter 31 and the second vaporization filter 32 is promoted as described later.

The first fan 81 and the second fan 82 share a single fan motor 8, and are fastened to respective shafts provided at both ends of the fan motor 8. A partition plate 83 is provided between the second fan 82 and the first fan 81 to partition a space into a space in which the second fan 82 is provided and a space in which the first fan 81 is provided. The partition plate 83 can prevent the first air conveyed by the first fan 81 and the second air conveyed by the second fan 82 from being mixed with each other.

The fan motor 8, the first fan 81, and the second fan 82 are disposed in a fan chamber defined by a fan casing 84. The fan chamber is defined by the fan casing 84, for example, a part of which is made of a heat transfer reducing member having a heat insulating property such as styrofoam. The partition plate 83 provided between the second fan 82 and the first fan 81 constitutes a part of the fan casing 84. Details of the fan casing 84 will be described later.

In the present embodiment, the fan motor 8 is disposed in the space that is partitioned by the partition plate 83 and in which the second fan 82 is provided. The partition plate 83 is provided between the fan motor 8 and the first fan 81. The fan motor 8 disposed in the space in which the second fan 82 is provided as described above can be cooled by the second air conveyed by the second fan 82, that is, the exhaust air. The fan motor 8 can be thus efficiently cooled by using the cold heat of the second air (exhaust air) without increasing the temperature of the first air (supply air) conveyed by the first fan 81. As the same effect can be exhibited when the fan motor 8 is disposed in the space that is partitioned by the partition plate 83 and in which the second fan 82 is provided, the positions of the second fan 82 and the fan motor 8 can be changed.

The air conditioner 1 is provided with an intake channel 51, a branch channel 52, a first channel 61, and a second channel 62 as air flow channels. The branch channel 52 branches the intake channel 51 into the first channel 61 and the second channel 62. The intake channel 51 starts from the two inlets 5 located in the rear direction and the right direction, and communicates with the sensible heat exchanger 4 via the branch channel 52. The first channel 61 is a space that communicates along the arrow indicating the supply air (SA) in FIG. 1. The second channel 62 is a space that communicates along an arrow indicating exhaust air (EA) in FIG. 1. Further, the intake channel 51 and the branch channel 52 are a common region before the air is distributed to the first channel 61 and the second channel 62. The air in the intake channel 51 and the branch channel 52 can be both the first air and the second air. The boundary between the intake channel 51 and the branch channel 52 of the present embodiment will be described later.

The branch channel 52 communicates with two entrances of the sensible heat exchanger 4. The two entrances of the sensible heat exchanger 4 include an entrance of a first path 41 of the sensible heat exchanger 4 into which the first air flows, and an entrance of a second path 42 of the sensible heat exchanger 4 into which the second air flows. The entrance of the first path 41 is defined in a first entrance opening surface 431. The entrance of the second path 42 is defined in a second entrance opening surface 432. The first path 41 constitutes a part of the first channel 61. The second path 42 constitutes a part of the second channel 62. The branch channel 52 and the sensible heat exchanger 4 are provided in this order downstream of the intake channel 51 in the flow direction of the intake air flowing through the intake channel 51.

In the branch channel 52, the intake air flows into either the entrance of the first path 41 or the entrance of the second path 42 in the sensible heat exchanger 4. The intake air is divided into first air flowing into the first path 41 and second air flowing into the second path 42 in the branch channel 52.

A dust collecting filter 53 is disposed between the two inlets 5 and the entrances of the first path 41 and the second path 42 of the sensible heat exchanger 4. The dust collecting filter 53 is formed of polyester or olefin fiber, and includes a filter part for collecting dust and a lattice-like frame body for fixing the filter part. The dust collecting filter 53 may be formed by insert molding in which the filter portion is placed inside a resin mold and then a resin as a material for the frame body is poured. The dust collecting filter 53 including a resin frame body has flexibility, and is curved to cover each of the entrances of the first path 41 and the second path 42 of the sensible heat exchanger 4. When the dust collecting filter 53 is provided in a curved manner, an inner surface of the housing 11 may be provided with a guide portion, which is for example a groove, into which an edge portion in the longitudinal direction of the dust collecting filter 53 is fitted.

The dust collecting filter 53 is provided to be curved as illustrated in FIG. 1, as the sensible heat exchanger 4 has a first entrance opening surface 431 and a second entrance opening surface 432 on different side surfaces. Thus, the dust collecting filter 53 can cover the first entrance opening surface 431 and the second entrance opening surface 432 with a single sheet. As only one dust collecting filter 53 is used, the time and labor for attaching and detaching the filter can be reduced.

Sealing members 531 are each provided at an end portion of the dust collecting filter 53. Both end portions of the dust collecting filter 53 include a first end portion near the first path 41 and a second end portion near the second path 42. The first end portion near the first path 41 is located at a contact portion between a first entrance opening surface 431 provided with the entrance of the first path 41 and an inner surface of the housing 11 opposed to the first entrance opening surface 431. The second end portion near the second path 42 is located between the drain pan 34, which will be described later, and an inner surface of the housing 11 close to the drain pan 34. The sealing members 531 each fill a gap between the inner surface of the housing 11 and the dust collecting filter 53.

Since the sealing member 531 is provided at each end portion of the dust collecting filter 53, air can be prevented from flowing to the sensible heat exchanger 4 without passing through the dust collecting filter 53. The dust collecting filter 53 can collect dust in air taken in from the inlets 5 and prevent dust buildup in the air flow channels through which air in the air conditioner 1 flows.

The space between the two entrances (which are the entrance of the first path 41 and the entrance of the second path 42) of the sensible heat exchanger 4 and the two inlets 5 is divided into an upstream space and a downstream space in the flow direction of each of the first air and the second air by the dust collecting filter 53. The dust collecting filter 53 divides the space into the upstream space which is a space surrounded by the housing 11 having the two inlets 5 and the dust collecting filter 53, and the downstream space which is a space surrounded by the dust collecting filter 53, the first entrance opening surface 431, and the second entrance opening surface 432. The upstream space corresponds to the intake channel 51. The downstream space corresponds to the branch channel 52. The intake channel 51 is a channel upstream of the branch channel 52 and shared by the first path 41 and the second path 42. The two inlets 5 can also be shared by the first path 41 and the second path 42, and the opening areas of the two inlets 5 can be increased to reduce channel resistance (pressure drop) to the intake air in a channel. Further, in order to reduce the channel resistance in a channel, the two inlets may be connected to each other. Similarly to the dust collecting filter 53, a side surface of the housing 11 may be curved and have a single inlet 5 to widen the opening area. In this case, the volume of the upstream space can be minimized, and the influence of turbulence that may occur in the upstream space can be minimized.

The sensible heat exchanger 4 is provided with the first path 41 through which the first air flows and the second path 42 through which the second air flows. The first path 41 is a part of the first channel 61 communicating with the first outlet 71. The second path 42 is a part of the second channel 62 communicating with the second outlet 72. The first path 41 and the second path 42 of the sensible heat exchanger 4 are defined by a plurality of hollow resin plates disposed in parallel. By reducing the thickness of the resin plates, heat conductivity can be improved, and the weight of the sensible heat exchanger 4 can be reduced. The hollow structure may be created by metal plates.

A resin plate defining the first path 41 and a resin plates defining the second path 42 are stacked such that the first path 41 extends perpendicular to the flow direction of the second air and the second path 42 extends perpendicular to the flow direction of the first air, and sensible heat exchange between the first air and the second air is performed via the resin plates. Since the first path 41 and the second path 42 are orthogonal to each other, a crossflow is formed by the first air flowing through the first path 41 and the second air flowing through the second path 42.

A resin frame is provided between a resin plate defining the first path 41 and a resin plate defining the second path 42 adjacent to each other. The resin frame may be a spacer for maintaining a distance between the adjacent resin plates. By using a resin frame as a spacer, the sensible heat exchanger 4 can be reduced in weight. The spacer plays a role of regulating the flow of air inside the sensible heat exchanger 4, so that the flow of air inside the sensible heat exchanger 4 becomes uniform, and the area for heat exchange between the first air and the second air can be increased. Inside the sensible heat exchanger 4, the air flow may be regulated by a spacer so that the first air and the second air exchange heat in a countercurrent flow relationship in a part of the path. The heat exchange efficiency of the sensible heat exchanger 4 can be improved by the heat exchange in countercurrent flow. A spacer for the second air may be thicker than a spacer for the first air. The spacer for the second air may be wider than the spacer for the first air. Thus, the pressure drop to the second air flowing in the sensible heat exchanger 4 can be reduced, and the volume of the second air can be increased more than the volume of the first air. In addition, the first air can be more efficiently cooled by the second air, and the temperature of the first air can be further lowered. In the present embodiment, the sensible heat exchanger 4 is of a plate type using resin plates. However, the sensible heat exchanger 4 is not limited thereto, and for example, paths formed of cylinders each shaped like a straw may be provided side by side.

The side surfaces of the sensible heat exchanger 4 are each provided with one of the entrance of the first path 41, the entrance of the second path 42, the exit of the first path 41, and the exit of the second path 42. The side surface having the entrance of the first path 41 corresponds to the first entrance opening surface 431. The side surface having the entrance of the second path 42 corresponds to the second entrance opening surface 432. The side surface having the exit of the first path 41 corresponds to a first exit opening surface 441. The side surface having the exit of the second path 42 corresponds to a second exit opening surface 442. In the first path 41, a plurality of spaces communicating from the first entrance opening surface 431 toward the first exit opening surface 441 are stacked. In the second path 42, a plurality of spaces communicating from the second entrance opening surface 432 toward the second exit opening surface 442 are stacked.

The second vaporization filter 32 is provided upstream of the second entrance opening surface 432 in the flow direction of the second air. The second vaporization filter 32 having a rectangular shape in the front view of FIG. 1 is provided such that one surface thereof faces the second entrance opening surface 432. The first vaporization filter 31 is provided on the downstream side of the first exit opening surface 441 in the flow direction of the first air. The first vaporization filter 31 having a rectangular shape in the front view of FIG. 1 is provided such that one surface thereof faces the first exit opening surface 441.

The second air divided in the branch channel 52 passes through the second vaporization filter 32, is cooled by the second vaporization filter 32, and then flows into the second path 42 inside the sensible heat exchanger 4 from the entrance of the second path 42 provided in the second entrance opening surface 432. The first air divided in the branch channel 52 flows into the first path 41 inside the sensible heat exchanger 4 from the entrance of the first path 41 provided in the first entrance opening surface 431.

The first air flowing through the first path 41 and the second air flowing through the second path 42 undergo heat exchange via the sensible heat exchanger 4. The second air flowing through the second path 42 is cooled by the second vaporization filter 32, and the temperature of the second air is lower than the temperature of the intake air immediately after being taken in at the inlets 5. The temperature of the first air immediately after flowing into the entrance of the first path 41 is equal to the temperature of the intake air immediately after being taken in at the inlets 5, but the first air is cooled by the second air flowing through the second path 42 via the sensible heat exchanger 4. Since the first air is higher in temperature than the second air, heat is drawn from the first air by the second air. As a result, the temperatures of the first air and the second air become lower than the intake air and the air outside the housing 11.

The first air flowing out from the exit of the first path 41 is further cooled by the first vaporization filter 31. Thus, the first air is cooled in two steps. The first air is cooled by using the second vaporization filter 32 as an indirect cold energy source via the second air and using the first vaporization filter 31 as a direct cold heat source. In the first step, sensible heat only is exchanged. In the second step, total heat is exchanged. The wet-bulb temperature in cooling the first air in two steps becomes lower than that in cooling using vaporization or sensible heat exchange only and cooling by sensible heat exchange after evaporative cooling. In addition, since the amount of water vaporized in the total heat exchange can be reduced, an increase in discomfort humidity can be prevented.

The first air that has flowed out from the exit provided in the first exit opening surface 441 of the first path 41 of the sensible heat exchanger 4 and has passed through the first vaporization filter 31 is conveyed by the first fan 81 located downstream of the first vaporization filter 31 and is blown out as supply air (SA) from the first outlet 71 to the space to be air-conditioned. The first outlet 71 may be provided with an outlet duct 711 having, for example, a bellows structure, and the first air may be blown out as supply air (SA) in a blowing direction adjusted by the outlet duct 711. As a result, the space around the operator in the moving object M can be cooled as the space to be air-conditioned. The first fan 81 is not limited to an aspect in which the first fan 81 is located downstream of the first vaporization filter 31, and the first fan 81 may be located upstream side of the first vaporization filter 31.

The second air that has flowed out from the exit provided in the second exit opening surface 442 of the second path 42 of the sensible heat exchanger 4 is conveyed by the second fan 82 located downstream of the exit of the second path 42 of the sensible heat exchanger 4, and is blown out as exhaust air (EA) from the second outlet 72 to the outside of the housing 11.

The first outlet 71 and the second outlet 72 are provided on the left side surface of the housing 11. The second outlet 72 may be directed toward the first outlet 71, and exhaust air (EA) blown out from the second outlet 72 may be blown out to the vicinity of the outlet duct 711 attached to the first outlet 71. Since the second outlet 72 is provided in front of the second fan 82, the second air sent from the second fan 82 is blown out in the left front direction. When the outlet duct 711 is provided, an increase in temperature of the outer surface of the outlet duct 711 due to direct sunlight or illumination can be prevented.

The exhaust air (EA) blown out from the second outlet 72 is blown to the vicinity of the periphery of the outlet duct 711, thereby lowering the ambient temperature of the outlet duct 711 to prevent the supply air (SA) blown out from the outlet duct 711 from rising due to the air outside the housing 11. Further, an increase in temperature of the outer surface of the outlet duct 711 due to direct sunlight or illumination can be prevented.

The air inlets 5 are provided on a side surface different from the side surface on which the first outlet 71 and the second outlet 72 are provided. This can prevent the occurrence of short-circuiting in which the air blown out from the first outlet 71 and the second outlet 72 is taken in from the inlets 5. In the air conditioner 1 of the present embodiment, it is not necessary that the ventilation efficiency be taken into consideration, and when a short circuit occurs on the air supply side or the air exhaust side, the air having a lower temperature than the outside air is cooled again, and there is an advantage that the wet-bulb temperature of the first air can be further lowered. At least one of the first outlet 71 or the second outlet 72 may be provided on the upper surface of the housing.

As illustrated in the drawings of the present embodiment, among the side surfaces of the housing 11, the side surface on which the two air inlets 5, the first outlet 71, and the second outlet 72 are not provided is provided with a door portion 111 configured to be openable and closable. The side surface on which the door portion 111 is provided is a side surface corresponding to a place where the end portion of the first vaporization filter 31 and the end portion of the second vaporization filter 32 are adjacent to each other, and is a side surface closest to the first vaporization filter 31 and the second vaporization filter 32. By opening the door portion 111, the inside of the housing 11 can be accessed from the outside, and for example, maintenance work such as replacement of the first vaporization filter 31 or the second vaporization filter 32 can be performed. Preferably, the door portion 111 is hinged to the housing 11 at an end portion of the door portion 111 other than the upper end portion, and an end portion of the door portion 111 opposite to the hinged end portion is movable to be fixed to the housing 11 by a lock mechanism. This prevents the door portion 111 from falling off at the time of opening, and facilitates holding the door portion 111 at the open state at the time of maintenance.

In the maintenance work, after the door portion 111 is opened, the first vaporization filter 31 and the second vaporization filter 32 are slidable in the horizontal direction to be attached and detached, and the height of the housing 11, that is, the height of the product can be lowered. Thus, the maintainability can be improved.

One of the side surfaces of the first vaporization filter 31 and one of the side surfaces of the second vaporization filter 32 are each integrally molded with a resin member. This improves the maintainability for the first vaporization filter 31 and the second vaporization filter 32 and prevents the leakage of wind from the element portion of each of the first vaporization filter 31 and the second vaporization filter 32, that is, the flow of air without passing through the element portion.

Such a resin member integrally molded on one of the side surfaces of the first vaporization filter 31 or the second vaporization filter 32 is provided with a handle portion or a grip portion. In maintenance work, the operator can easily attach and detach the first vaporization filter 31 and the second vaporization filter 32 by holding the handle portion, and maintainability can be improved.

The two vaporization filters that are the first vaporization filter 31 and the second vaporization filter 32 may be drawn out in a crossing relationship. This allows commonality of parts and reduced cost by the reduction of the parts cost. In addition, since the first vaporization filter 31 and the second vaporization filter 32 can be pulled out from the inspection opening space corresponding to the size of the housing 11, the size of the housing 11, that is, the product size can be reduced.

To prevent the two vaporization filters that are the first vaporization filter 31 and the second vaporization filter 32 from moving, a pressing portion for fixing the vaporization filters is provided to come into contact with and press a part of the door portion 111, thereby bringing the door portion 111 into pressure contact. Thus, leakage of the first air and the second air, that is, mixing of the first air and the second air can be prevented. The vaporization filters can be prevented from shifting due to vibration or other causes. Further, the vaporization filter can be prevented from being mispositioned at the time of attachment and detachment in maintenance work.

An inner surface of the door portion 111 is provided with a blocking member 112 to block entry of air into the first channel 61 without passing through the first vaporization filter 31. The blocking member 112 includes, for example, a sealing material, and is to be pinched between the inner surface of the door portion 111 and the edge portion of the first vaporization filter 31 by closing the door portion 111 to exhibit a sealing function, thereby blocking air from entering the first channel 61 without passing through the first vaporization filter 31.

The blocking member 112 is not limited to being attached to the inner surface of the door portion 111, and the blocking member 112 may be affixed to the first vaporization filter 31 or a fastening member that fastens the first vaporization filter 31 and the second vaporization filter 32. The blocking member 112 being provided on the inner surface of the door portion 111 is not limited to the blocking member 112 affixed to the inner surface of the door portion 111, and includes, for example, the blocking member 112 affixed to the first vaporization filter 31 or the like.

The air conditioner 1 includes the tank 12 for storing water to be supplied to the first vaporization filter 31 and the second vaporization filter 32. The tank 12 is configured as a separate body from the housing 11 that houses the first vaporization filter 31 and the second vaporization filter 32. In the air conditioner 1, the housing 11 as a main body and the tank 12 as a separate body are communicated with each other by a supply water channel 91 and a recovery water channel 92. Water supplied from the tank 12 to the first vaporization filter 31 and the second vaporization filter 32 housed in the housing 11 flows through the supply water channel 91. Water not vaporized at the first vaporization filter 31 and the second vaporization filter 32 flows through the recovery water channel 92 and is recovered in the tank 12. The supply water channel 91 and the recovery water channel 92 are configured as hoses made of a soft resin or pipes made of a hard resin. When the tank 12 is installed in the moving object M in the present embodiment, the tank 12 is preferably installed at the back of or near the feet of the operator to facilitate water supply and replacement. Preferably, the supply water channel 91 and the recovery water channel 92 are bound to a leg of a head guard in order to enhance visibility of the operator and to prevent water leakage by being caught at the time of operation.

Figure 5:
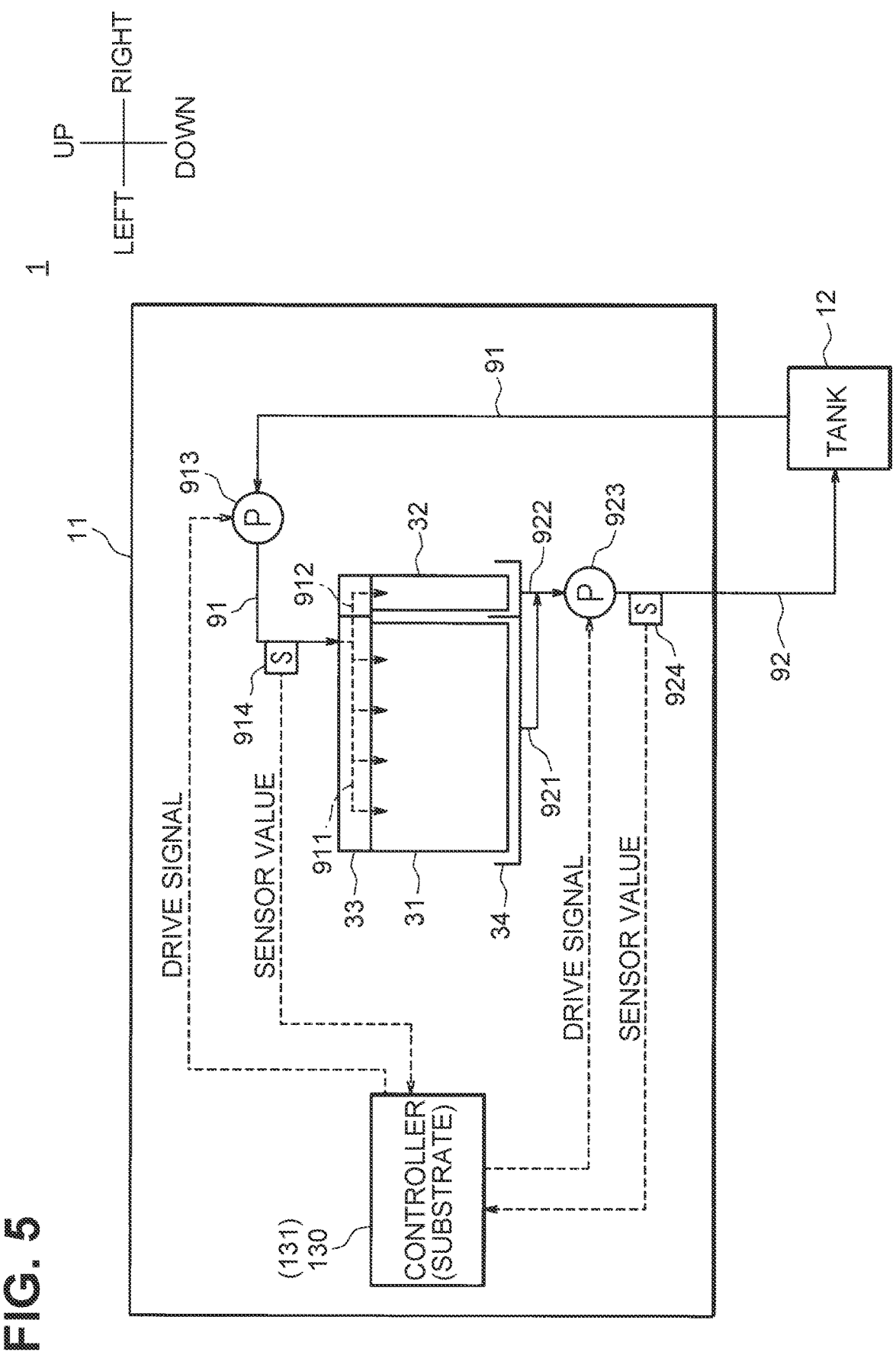
FIG. 5 is an illustration diagram of water supply from a tank.

As illustrated in FIG. 5, the supply water channel 91 is provided with a water supply pump 913 and a supply water sensor 914. When the housing 11 and the tank 12 are placed at different locations and a height difference (lift) is generated between the housing 11 and the tank 12, water can be sent from the tank 12 located below to the housing 11 located above by the water supply pump 913 having a water supply capacity corresponding to the lift. The supply water sensor 914 is provided inside the supply water channel 91, for example, and outputs a detection value corresponding to the amount of water flowing through the supply water channel 91.

The recovery water channel 92 is provided with a recovery pump 923 and a recovery water sensor 924. Even when the housing 11 and the tank 12 are placed in different places and the housing 11 is located above the tank 12, the water stored in the drain pan 34 can be reliably recovered by the recovery pump 923. The recovery water sensor 924 is provided, for example, inside the recovery water channel 92 to output a detection value corresponding to the amount of water flowing through the recovery water channel 92. In the present embodiment, both the supply water sensor 914 and the recovery water sensor 924 are provided, but either one of the sensors may be provided. Further, the amount of supplied or recovered water may be estimated by detecting the torque of the water supply pump 913 or the recovery pump 923, and the supply water sensor 914 and the recovery water sensor 924 may be eliminated. Alternatively, the air conditioner 1 may be configured to include only the recovery water sensor 924. The recovery water sensor 924 can detect the water discharged from the drain pan 34 and recovered in the tank 12, and eliminate the need for the supply water sensor 914, which can reduce the number of sensors to be mounted on the air conditioner 1, thus cutting down on costs due to reduction in component count.

The water supply pump 913, the supply water sensor 914, the recovery pump 923, and the recovery water sensor 924 are connected to the controller 130, and the controller 130 drives the water supply pump 913 and the recovery pump 923 based on a detection value output from the supply water sensor 914, the recovery water sensor 924, or both sensors.

A part of the supply water channel 91 extending from the tank 12 is housed in the housing 11 and communicates with the water supply part 33 attached above the first vaporization filter 31 and the second vaporization filter 32. A part of the supply water channel 91 housed in the housing 11 is provided in the upstream space (intake channel 51) partitioned by the dust collecting filter 53. When the air conditioner 1 is mounted on the moving object M and used outdoors, the temperature of water in the tank 12 is heated by direct sunlight, and may become higher than the outside air temperature (the temperature of intake air). Even in such a case, the water (supply water) flowing through the supply water channel 91 located in the upstream space (intake channel 51) undergoes heat exchange with the intake air flowing through the intake channel 51, and the water (supply water) is cooled by the intake air, thus enhancing the cooling efficiency of the air conditioner 1. The outer peripheral surface of the supply water channel 91 disposed in the upstream space may be provided with, for example, fins to increase the heating surface area on which heat is exchanged with the intake air, thereby improving the heat transfer efficiency. Further, in order to cool the water in the supply water channel 91, the supply water channel 91 may be arranged so as to pass through a portion of the second channel 62 downstream of the sensible heat exchanger 4.

The water (supply water) that has flowed into the water supply part 33 is diverted into a first supply water channel 911 on the first vaporization filter 31 and a second supply water channel 912 on the second vaporization filter 32. The water diverted into the first supply water channel 911 passes through first water supply holes 331 provided in the water supply part 33 and drips in the first vaporization filter 31, and the water diverted into the second supply water channel 911 passes through second water supply holes 332 and drips in the second vaporization filter 32 (refer to FIG. 7). The water that has dripped in the first vaporization filter 31 and the second vaporization filter 32 permeates into the first vaporization filter 31 and the second vaporization filter 32. At this time, the water (supply water) sequentially drips down from the first water supply holes 331 and the second water supply holes 332 due to the water pressure by the pump, the weight of the water, and the negative pressure inside the first channel 61 and the second channel 62.

The water that has permeated into the first vaporization filter 31 and the second vaporization filter 32 is vaporized when the first air and the second air pass through, but due to the amount of supplied water and the relative humidity of the environment in which the air conditioner 1 is used, some supplied water remaining in liquid form flows into the drain pan 34 located below the first vaporization filter 31 and the second vaporization filter 32. The drain pan 34 is divided into two regions, for example, a region corresponding to the first vaporization filter 31 (first drain region) and a region corresponding to the second vaporization filter 32 (second drain region). This can prevent mixing of the first air and the second air flowing into the drain pan 34.

The drain pan 34 and the tank 12 communicate with each other through the recovery water channel 92, and the recovery water channel 92 includes a first recovery water channel 921 communicating with the first drain region and a second recovery water channel 922 communicating with the second drain region (refer to FIG. 5). The first recovery water channel 921 and the second recovery water channel 922 are merged, and then communicate with the tank 12 via the recovery pump 923. The water (to be recovered) that has flowed down to the drain pan 34 (the first drain region and the second drain region) is recovered in the tank 12 via the recovery water channel 92 (the first recovery water channel 921 and the second recovery water channel 922). In FIG. 5, when the recovery pump 923 has two water inlets corresponding to the first recovery water channel 921 and the second recovery water channel 922, the first recovery water channel 921 and the second recovery water channel 922 may be connected to the respective water inlets of the recovery pump 923, and may be merged at the recovery pump 923.

The tank 12 communicates with the first vaporization filter 31 and the second vaporization filter 32 through the supply water channel 91 and the recovery water channel 92. Thus, the tank 12, the supply water channel 91, the water supply part 33, the first vaporization filter 31 and the second vaporization filter 32, the drain pan 34, and the recovery water channel 92 define a circulation circuit to recover water in the tank 12. The circulation circuit efficiently recovers water, which has not vaporized at the first vaporization filter 31 and the second vaporization filter 32, in the tank 12, reduces the amount of the water remaining in the housing 11, and enhances the degree of hygiene in the housing 11.

Figure 3:
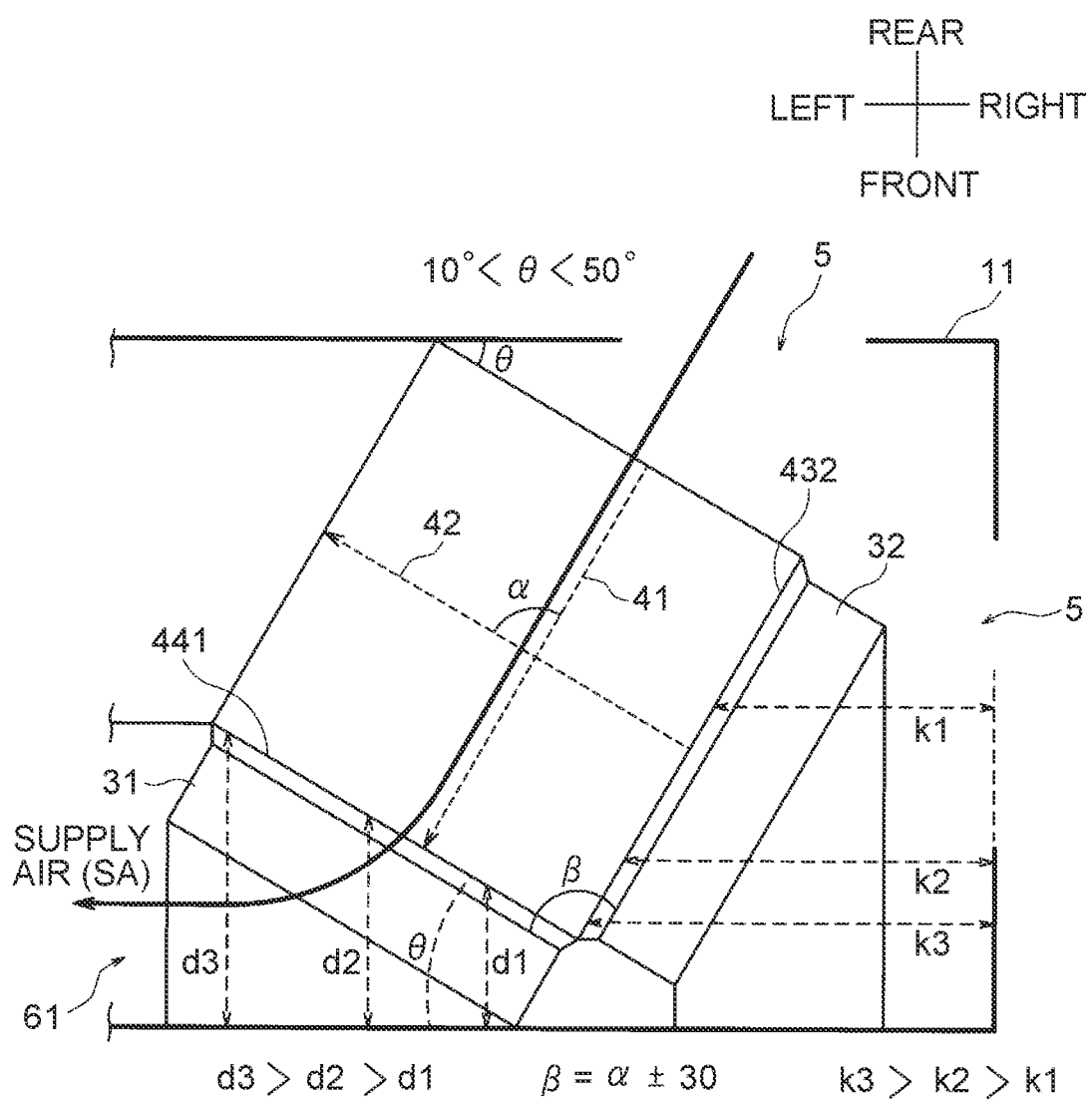
FIG. 3 is a schematic plan view illustrating a sensible heat exchanger in an arrangement aspect.

FIG. 3 is a schematic plan view illustrating the arrangement of the sensible heat exchanger 4. In FIG. 3, some components such as the dust collecting filter 53 and the water supply part 33 are omitted. The sensible heat exchanger 4 has a rectangular shape in a front view and has, for example, a rectangular parallelepiped appearance. The first path 41 and the second path 42 provided in the sensible heat exchanger 4 are orthogonal to each other, and an angle of intersection between the first path 41 and the second path 42 of the present embodiment is, for example, 90°.

The sensible heat exchanger 4 includes, as side surfaces, the first entrance opening surface 431, the second entrance opening surface 432, the first exit opening surface 441, and the second exit opening surface 442, and an angle formed by adjacent side surfaces is, for example, 90°. The first entrance opening surface 431, the second entrance opening surface 432, the first exit opening surface 441, and the second exit opening surface 442 are provided in this order in a circumferential direction of the sensible heat exchanger 4, which is viewed from the front. The first entrance opening surface 431 is adjacent to the second entrance opening surface 432, the second entrance opening surface 432 is adjacent to the first exit opening surface 441, the first exit opening surface 441 is adjacent to the second exit opening surface 442, and the second exit opening surface 442 is adjacent to the first entrance opening surface 431.

The sensible heat exchanger 4 is housed in the housing 11 so that an inner surface of the housing 11 and an end surface of the sensible heat exchanger 4 facing the inner surface form an acute angle. In the following description, an angle formed by the front inner surface of the housing 11 and the first exit opening surface 441 is defined as an angle θ. For example, the angle θ is an acute angle greater than 10 degrees and less than 50 degrees. The lower limit value, 10 degrees, of the angle θ is determined in order to maintain the diameter of the first channel 61. The upper limit value of the angle θ is determined by the arrangement of the fan motor 8 and the electric unit 13 provided downstream of the second path 42 and the arrangement of the partition plate 83. Specifically, the angle θ is determined such that the left end portion of the first exit opening surface 441 and the right end portion of the partition plate 83 can be connected to each other. Preferably, the upper limit value of the angle θ is determined by adopting a configuration in which the left end portion of the first exit opening surface 441 and the right end portion of the partition plate 83 are disposed in front of the rear end portion of at least one of the fan motor 8 and the electric unit 13 so that the second air easily flows to the fan motor 8 and the electric unit 13. Thus, the second air easily flows to the fan motor 8 and the electric unit 13, and the efficiency for cooling the fan motor 8 and the electric unit 13 is enhanced. The sensible heat exchanger 4 is housed in the housing 11 with an end surface of the sensible heat exchanger 4, which face an inner surface of the housing 11, being rotated by the angle θ, which corresponds to an acute angle, from a parallel state (posture position) in which an angle formed by the end surface of the sensible heat exchanger 4 and the inner surface of the housing 11 is 0 degrees. Thus, for example, since the housing 11 is a rectangular parallelepiped and the sensible heat exchanger 4 is a cube, the angle between the first entrance opening surface 431 and the rear inner surface of the housing 11 facing the first entrance opening surface 431 is equal to the angle between the first exit opening surface 441 and the front inner surface of the housing 11 facing the first exit opening surface 441. As the sensible heat exchanger 4 is housed in the housing 11 in a state where the sensible heat exchanger 4 is rotated at the predetermined rotation angle as described above, the sensible heat exchanger 4 can have a larger area for heat exchange (heat exchange area) with respect to the size of housing 11. In addition, as the angle θ is set in a range of greater than 10 degrees and less than 50 degrees and not 45 degrees, the dimensions of the housing 11 in the front-rear and left-right directions can be made shorter at the angle θ than at 45 degrees. Thus, the dimensions of the housing 11 in the front-rear and right-left directions can be reduced with respect to the heat exchange area, and the housing 11 is compact in size. Similarly, since the first vaporization filter 31 and the second vaporization filter 32 are provided along the first exit opening surface 441 and the second entrance opening surface 432 of the sensible heat exchanger 4, the length of the cooling unit 3 in the left-right direction can be shortened, and the area of the door portion 111 provided for maintenance can also be reduced.

As the sensible heat exchanger 4 is disposed at the angle θ corresponding to the predetermined acute angle with respect to the housing 11, a surface-to-surface distance between the first exit opening surface 441 and the front inner surface of the housing 11 facing the first exit opening surface 441 can increase gradually downstream in a direction of the flow of the first air. To be more specific, as illustrated in FIG. 3, the surface-to-surface distance increases gradually toward the first outlet 71 (d3>d2>d1). That is, the surface-to-surface distance between the most downstream portion of the first exit opening surface 441 and the inner surface of the housing 11 can be maximized. This can reduce the channel resistance (pressure drop) when the first air flows out from the first exit opening surface 441. A surface-to-surface distance between the second entrance opening surface 432 and the right inner surface of the housing 11 facing the second entrance opening surface 432 decreases with distance from the first exit opening surface 441 (k3>k2>k1).

The first vaporization filter 31 facing the first exit opening surface 441 and the second vaporization filter 32 facing the second entrance opening surface 432 are fastened to a casing covering an upper portion of the drain pan 34 provided below and are disposed in an L-shape. In this case, the casing that covers the upper portion of the drain pan 34 functions as a fastening member that fastens the first vaporization filter 31 and the second vaporization filter 32. An angle (β) formed by the first vaporization filter 31 and the second vaporization filter 32, which are disposed in an L shape, is greater than or equal to the angle of intersection (α) between the first path 41 and the second path 42, and is, for example, 60 degrees to 120 degrees. In consideration of a case where the sensible heat exchanger 4 has, for example, a diamond shape, the relationship between the angle (β) and the angle (α) when expressed by an equation is preferably β=α±30 (degrees). The first vaporization filter 31 and the second vaporization filter 32 are disposed in an L shape, so that the inside of the L shape defined by the end surfaces of the first vaporization filter 31 and the second vaporization filter 32 is along a corner portion of the sensible heat exchanger 4. This improves the storability of the first vaporization filter 31 and the second vaporization filter 32, and contributes to the reduced size of the housing 11. In FIG. 3, for downsizing, the first vaporization filter 31 has a shorter length than the first exit opening surface 441. The length of the first vaporization filter 31, however, may be changed as appropriate. As an example, it is preferable that the lengths of the first exit opening surface 441 and the first vaporization filter 31 are determined so that the first exit opening surface 441 and the first vaporization filter 31 have similar channel cross-sectional areas. This enables reduction in pressure drop due to the change in the channel cross-sectional area. In addition, it is preferable that a wall surface (seal member) is located between the first exit opening surface 441 and the first vaporization filter 31 to define a channel therebetween so that the first air that has passed through the first exit opening surface 441 passes through the first vaporization filter 31. This wall surface may be included in the casing of the first vaporization filter 31 or a fixed member of the sensible heat exchanger 4. The second vaporization filter 32 may be appropriately changed in the same manner as the first vaporization filter 31. For downsizing, the second vaporization filter 32 has a shorter length than the second entrance opening surface 432. The length of the second vaporization filter 32, however, may be changed as appropriate. As an example, it is preferable that the lengths of the second exit opening surface 442 and the second vaporization filter 32 are determined so that the second exit opening surface 442 and the second vaporization filter 32 have a similar channel cross-sectional area. This enables reduction in pressure drop due to the change in the channel cross-sectional area. In addition, it is preferable that a wall surface is located between the second entrance opening surface 432 and the second vaporization filter 32 to define a channel therebetween so that the second air that has passed through the second vaporization filter 32 passes through the second entrance opening surface 432.

Figure 4:
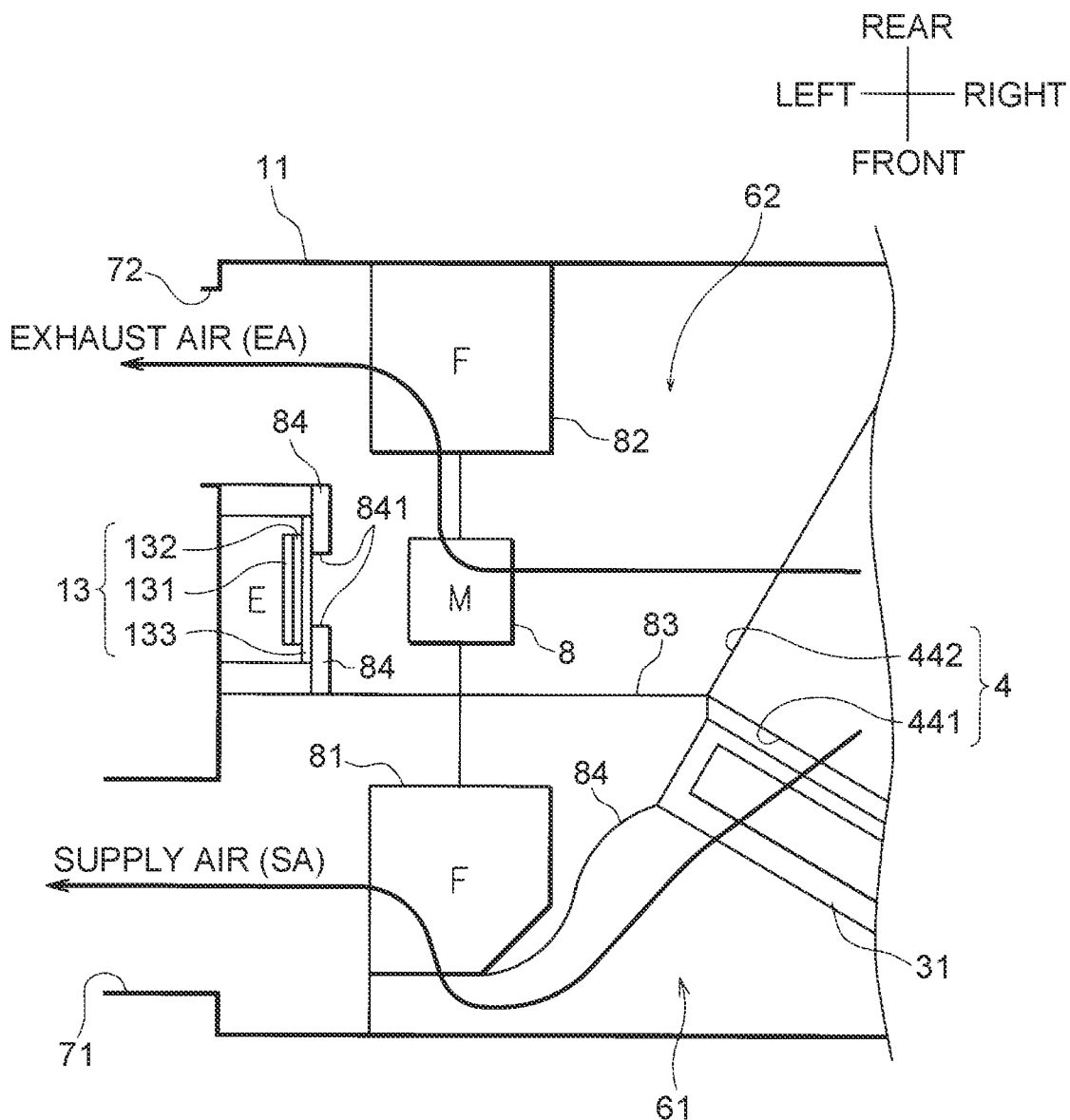
FIG. 4 is an illustration diagram of an electric unit for cooling.

FIG. 4 illustrates the electric unit 13 (substrate 131) for cooling. The fan motor 8, the first fan 81, and the second fan 82 are disposed in the fan chamber which is defined by the fan casing 84 partially made of a heat transfer reducing member having a heat insulating property such as styrofoam. In FIGS. 1 and 4, the fan chamber is partitioned into the first channel 61 and the second channel 62 by the partition plate 83 that is a part of the fan casing 84 and prevents the first air conveyed by the first fan 81 and the second air conveyed by the second fan 82 from being mixed.

The fan motor 8 and the electric unit 13 are located in a fan chamber accommodating the second fan 82 to be cooled by the second air flowing out from the sensible heat exchanger 4. In FIG. 4, the details of the channel structure in the fan chamber accommodating the second fan 82 and the arrangement of the heat insulating material are partially omitted. As an example, various configurations can be employed, such as a honeycomb structured rectifying plate for rectifying the second air, and a desiccant for dehumidification.

The electric unit 13 includes a substrate 131 on which a controller 130 for controlling the air conditioner 1 is mounted, a heat transfer promoting member 132 provided on a back surface of a mounting surface of the substrate 131, and a sealing plate 133 to which the heat transfer promoting member 132 is affixed. The heat transfer promoting member 132 is disposed between the substrate 131 and the sealing plate 133, and the substrate 131, the heat transfer promoting member 132, and the sealing plate 133 form a laminated structure. The heat transfer promoting member 132 is, for example, a heat transfer sheet or a heat transfer paste, which is made of a heat-dissipating material charged with a high heat-dissipating filler and having an insulating property and a high thermal conductivity. The sealing plate 133 is a plate made of a metal having high thermal conductivity such as copper or aluminum, and may be, for example, a part of the exterior of the electric unit 13 forming a box body. The mounting surface of the substrate 131 is populated with a semiconductor chip constituting the controller 130 and electric components such as a coil and a capacitor, which generate heat when a current flows therethrough. Although the substrate 131 serves as a heat generation source, heat generated in the substrate 131 is radiated, via the heat transfer promoting member 132 and the sealing plate 133 which form the laminated structure, from the sealing plate 133 to the internal space of the fan chamber having the second fan 82. A surface of the sealing plate 133 adjacent to the fan casing 84 may be provided with a portion for increasing a heat dissipation area, such as a fin, a pin, or a heat sink.

A portion of the fan casing 84 provided at a location where the electric unit 13 is disposed has a through hole 841 opening toward the second channel 62. The portion of the fan casing 84 is made of, for example, a plate-shaped styrofoam, which defines the through hole 841. The sealing plate 133 of the electric unit 13 seals the through hole 841 of the fan casing 84 from the substrate 131 side.

The electric unit 13 is disposed separately from the fan chamber accommodating the second fan 82, and the through hole 841 of the fan casing 84 is sealed by the sealing plate 133 of the electric unit 13, so that the substrate 131 included in the electric unit 13 can be prevented from being directly exposed to the second air and being affected by water vapor (moisture) included in the second air. In addition, heat can be exchanged between the substrate 131 and the second air via the sealing plate 133 exposed from the through hole 841 of the fan casing 84, and the substrate 131 can be cooled by the second air. The sealing plate 133 may be provided with a heat dissipation fin or a heat dissipation pin protruding from the through hole 841 of the fan casing 84 toward the inside of the fan chamber of the second fan 82. The sealing plate 133 having such a heat dissipation fin or pin protruding from a surface of the sealing plate 133 can increase a heat transfer area exposed to the second air in the part of the fan chamber having the second fan 82, thereby enhancing heat transfer efficiency. Since the heat transfer promoting member 132 made of a heat dissipation material is provided between the substrate 131 and the sealing plate 133, the heat transfer efficiency can be improved between the substrate 131 and the sealing plate 133 (second air) and the second air can be used to more efficiently cool the substrate 131. In addition, the second channel 62 including the electric unit 13 may not include the heat transfer reducing member, and may be defined by the sealing plate 133 or a heat dissipation material. As a result, the area in which heat is exchange between the second air and the electric unit 13 can be increased to enhance the cooling efficiency.

A part of the fan casing 84 defining the part of the fan chamber having the second fan 82 may be constituted by an inner surface of the housing 11 to which the second fan 82 is housed. The inner surface of the housing 11 constituting the part of the fan casing 84 can be cooled by the second air, and the temperature rise of the outer surface of the housing 11 due to the influence of the outside air can be reduced. In addition, the second fan 82 may be positioned in close contact with the inner surface of the housing 11, so that the inner surface of the housing 11 may function as a surface of the second fan 82. This enables increase in the flow rate of the second air at the position of the second fan 82, which can cool the inner surface of the housing 11 actively with the second air and reduce the temperature rise of the outer surface of the housing 11 due to the influence of the outside air.

The fan casing 84 defining the part of the fan chamber having the first fan 81 is made of a heat transfer reducing member having a heat insulating property such as styrofoam. This reduces the influence of the outside air on the first air passing through the fan chamber accommodating the first fan 81 (the first channel 61), which can reduce the temperature rise of the first air. The outer shell of the first fan 81 may have a chamfer across a corner along the portion of the fan casing 84 that communicates with the exit of the first path 41 of the sensible heat exchanger 4.

FIG. 5 is an illustration diagram of water supply from the tank 12. The tank 12 communicates with the first vaporization filter 31 and the second vaporization filter 32 through the supply water channel 91 and the recovery water channel 92. Thus, the tank 12, the supply water channel 91, the water supply part 33, the first vaporization filter 31 and the second vaporization filter 32, the drain pan 34, and the recovery water channel 92 define a circulation circuit to recover water in the tank 12.

The supply water channel 91 is connected to a water supply part 33 attached to upper portions of the first vaporization filter 31 and the second vaporization filter 32. The water supply part 33 includes a first water supply region 991 located above the first vaporization filter 31 and a second water supply region 992 located above the second vaporization filter 32.

Figure 7:
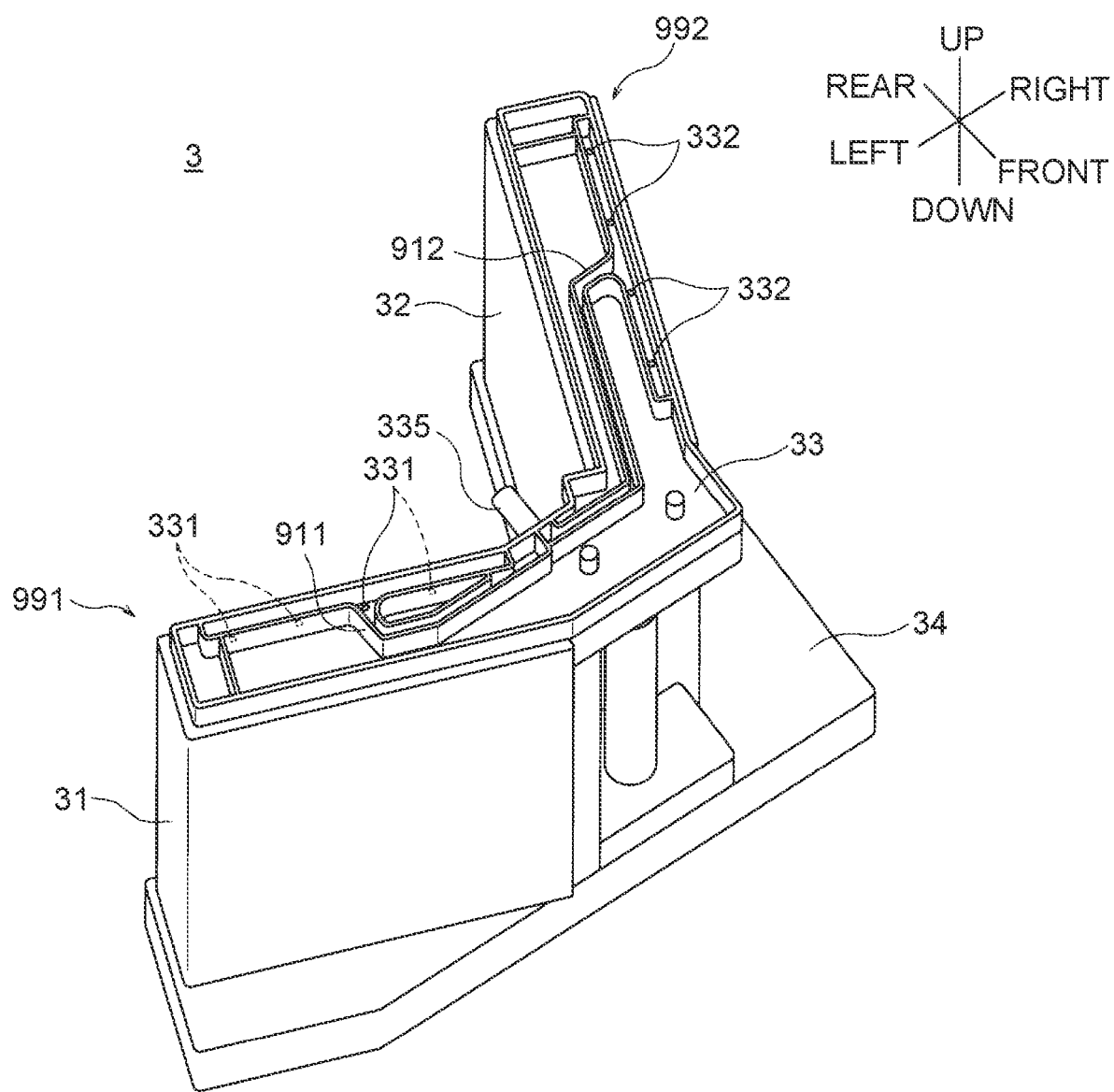
FIG. 7 is a schematic perspective view of the cooling unit.

The water supply part 33 is shaped like a dish having an opening in its upper end, and an inner surface of the dish-shaped water supply part 33 is provided with ribs and grooves that form a first supply water channel 911 and a second supply water channel 912 through which the water supplied from the tank 12 flows. The first supply water channel 911 and the second supply water channel 912 are part of the supply water channel 91. The first supply water channel 911 is included in the first water supply region 991, and the second supply water channel 912 is included in the second water supply region 992 (FIG. 7). The water flowing into the water supply part 33 is diverted into the first supply water channel 911 and the second supply water channel 912.

The water flowing through the first supply water channel 911 passes through first water supply holes 331 provided in the first supply water channel 911 and drips into the first vaporization filter 31. The water flowing through the second supply water channel 912 passes through second water supply holes 332 provided in the second supply water channel 912 and drips into the second vaporization filter 32. The first fan 81 is disposed downstream of the first vaporization filter 31 in the flow direction of the first air. Similarly, the second fan 82 is disposed downstream of the second vaporization filter 32 in the flow direction of the second air. The first vaporization filter 31 and the second vaporization filter 32 are under negative pressure, thus facilitating dripping and permeation of water into the first vaporization filter 31 and the second vaporization filter 32. The water (supply water) that has dripped in the first vaporization filter 31 and the second vaporization filter 32 permeates into the first vaporization filter 31 and the second vaporization filter 32 and is vaporized, and is mixed as water vapor in the first air and the second air passing through the first vaporization filter 31 and the second vaporization filter 32. Depending on the relative humidity of the environment in which the air conditioner 1 is used and the supply amount of water, some of the supplied water is not vaporized and flows into the drain pan 34 located below the first vaporization filter 31 and the second vaporization filter 32 in liquid form.

The drain pan 34 is divided into, for example, a region (first drain region) corresponding to the first vaporization filter 31 and a region (second drain region) corresponding to the second vaporization filter 32. The first recovery water channel 921 communicates with the first drain region, and the second recovery water channel 922 communicates with the second drain region. The first recovery water channel 921 and the second recovery water channel 922 constitute part of the recovery water channel 92. The first recovery water channel 921 and the second recovery water channel 922 are merged, and then communicate with the tank 12 via the recovery pump 923. Thus, water that has flowed down to the drain pan 34 (water that has not been vaporized at the first vaporization filter 31 and the second vaporization filter 32) is recovered in the tank 12 via the recovery water channel 92 (the first recovery water channel 921 and the second recovery water channel 922). In this example, it is preferable that a connection point between the first drain region and the first recovery water channel 921 and a connection point between the second drain region and the second recovery water channel 922 are adjacent to each other, or the first drain region and the second drain region have the same shape and inclination so that the drainage capacity remains unchanged even when the inclination of the moving object M changes. In another example, the drain pan 34 may not be divided into two regions of the first drain region and the second drain region, and the first recovery water channel 921 and the second recovery water channel 922 may be a single water recovery passage. This can reduce degradation in the water discharge ability of the recovery pump 923 due to suction of air from one of the first recovery water channel 921 and the second recovery water channel 922. That is, water inside the air conditioner 1 can be sufficiently discharged, and generation of slime can also be prevented.

The supply water channel 91 is provided with a supply water sensor 914, and the recovery water channel 92 is provided with a recovery water sensor 924. Each of the supply water sensor 914 and the recovery water sensor 924 includes, for example, a water wheel portion that is rotated by water flowing through the supply water channel 91 or the recovery water channel 92, and outputs a detection value regarding the presence or absence of water flowing through the supply water channel 91 and the recovery water channel 92 or the amount of water (volume flow rate) in accordance with the rotation of the water wheel portion.

The supply water sensor 914 and the recovery water sensor 924 are communicably connected to the controller 130 (substrate 131), and the controller 130 can obtain data on the presence or absence of water flowing through the supply water channel 91 and the recovery water channel 92 or the amount of water (volume flow rate) based on detection values output from the supply water sensor 914 and the recovery water sensor 924. The controller 130 is constituted by, for example, a microcomputer including a storage unit such as a memory and a control unit such as an MPU.

The controller 130 is further communicably connected to the water supply pump 913 and the recovery pump 923, and performs drive control such as driving and stopping of the water supply pump 913 and the recovery pump 923, for example, by transmitting a drive signal. The controller 130 obtains data such as the presence or absence of water flowing through the supply water channel 91 and the recovery water channel 92 based on the supply water sensor 914 and the recovery water sensor 924. The controller 130 may obtain, for example, a current value (motor current value) of a motor included in the water supply pump 913 and the recovery pump 923 by using a shunt resistor, and may determine the presence or absence of water flowing through the supply water channel 91 and the recovery water channel 92 based on the motor current value. When there is no water flowing in the supply water channel 91 and the recovery water channel 92, the motors of the water supply pump 913 and the recovery pump 923 run at idle, the torque applied to the motors is reduced, and the motor current value is also reduced. Thus, a predetermined threshold value is set for the motor current value, and when the motor current value is smaller than or equal to the predetermined threshold value, the controller 130 can determine that there is no water flowing in the supply water channel 91 and the recovery water channel 92.

The water supply pump 913, the supply water sensor 914, the recovery pump 923, and the recovery water sensor 924 disposed in the supply water channel 91 and the recovery water channel 92 are all housed in the housing 11. That is, the tank 12 only communicates with the supply water channel 91 and the recovery water channel 92, and has no mounted electric components such as the water supply pump 913, the supply water sensor 914, the recovery pump 923, and the recovery water sensor 924. As a result, the structure and configuration of the tank 12 can be simplified, and the degree of freedom in placing the tank 12 separate from the housing 11 can be improved.

Figure 6:
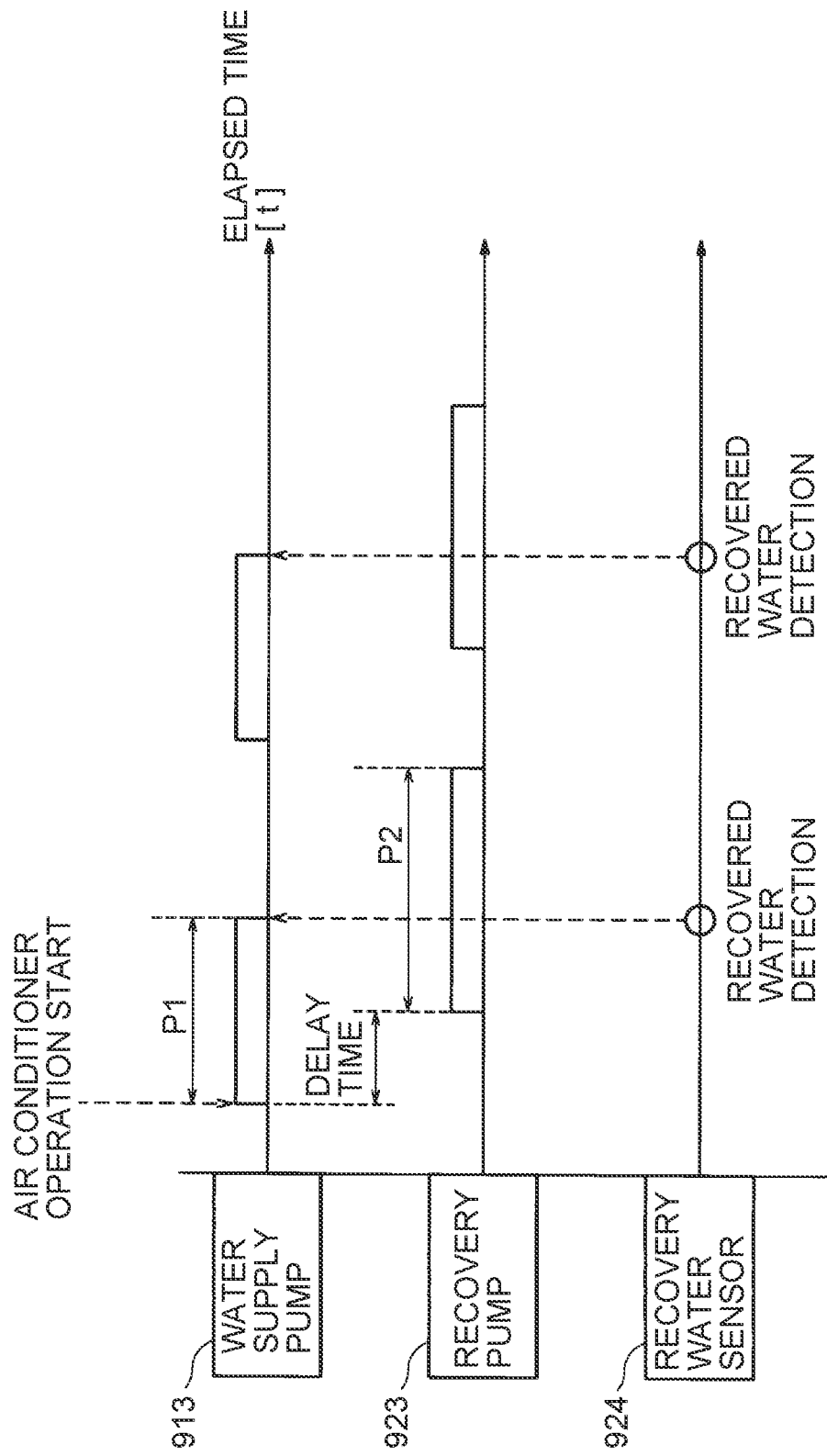
FIG. 6 is an illustration diagram of pumps in driving.

FIG. 6 is an illustration diagram regarding the driving of the pumps (the water supply pump 913 and the recovery pump 923). The controller 130 drives the water supply pump 913 and the recovery pump 923 in different time zones in which the water supply pump 913 and the recovery pump 923 are driven. The controller 130 periodically drives the water supply pump 913 and the recovery pump 923. Thus, the water supply pump 913 and the recovery pump 923 perform an intermittent operation in which a drive state and a stop state are periodically repeated.

For example, when the operation of the air conditioner 1 is started by an operation of an operator of the air conditioner 1, the controller 130 drives the water supply pump 913 before the recovery pump 923. A predetermined delay time is provided between the drive start time of the water supply pump 913 and the drive start time of the recovery pump 923. The operation of the air conditioner 1 may be started in conjunction with the start of the moving object M. The delay time may be, for example, a variable time until the amount of supplied water output from the supply water sensor 914 exceeds a predetermined amount. Further, the delay time may be a predetermined constant time.

The controller 130 stops the driving of the water supply pump 913, for example, when obtaining a detection value indicating that water is flowing through the recovery water channel 92 from the recovery water sensor 924. The fact that water (recovered water) flows through the recovery water channel 92 indicates that water that has not been vaporized at the first vaporization filter 31 or the second vaporization filter 32 is flowing down to the drain pan 34. When the recovery water sensor 924 outputs a detection value indicating that water flows in the recovery water channel 92, the driving of the water supply pump 913 is stopped, thus preventing excessive supply of water (supply water) to the first vaporization filter 31 and the second vaporization filter 32.

When the air conditioner 1 is mounted on a moving object such as a forklift, the power of the air conditioner 1 may be turned on and off in conjunction with the turning of the ignition key of the forklift. The power of the air conditioner may be turned on by turning on the engine of the forklift, and the power of the air conditioner 1 may be turned off by turning off the engine of the forklift. When the air conditioner 1 is turned on for the first time after the previous operation was ended with the tank 12 determined as running dry, the controller 130 may drive the water supply pump 913 for a longer time to supply a larger amount of water at the first water supply time than at subsequent water supply times. Under such a control mode, if the tank runs dry, the air conditioner 1 enters the fan-only mode, thus preventing the vaporization filters from being excessively dried. The air conditioner 1 performs the initial water supply operation only after the tank was determined as running dry in the previous operation, not always when the power is turned on. This prevents the driving time of the water supply pump 913 from becoming long, and thus retard the age deterioration of the water supply pump 913 due to the long-time driving.

When the water is excessively supplied to the first vaporization filter 31 and the second vaporization filter 32, the exchange of sensible heat between the water and the first air and the second air passing through these filters is accelerated, which leads to concern about the possibility that the vaporization amount of the water may be reduced. However, the drive of the water supply pump 913 is stopped to optimize the supply amount of water, thereby efficiently vaporizing the water.

When the controller 130 drives the water supply pump 913 to supply water to the first vaporization filter 31 and the second vaporization filter 32, the controller 130 may control the driving of the water supply pump 913 based on the wet-bulb temperature of the outside air measured using a thermocouple provided in contact with a surface of the second vaporization filter 32. The thermocouple may be disposed in contact with, for example, an upstream surface of the second vaporization filter 32 with respect to the flow of the second air to measure the wet-bulb temperature and the dry-bulb temperature of the outside air. The controller 130 may derive the vaporizable amount based on the difference between the wet-bulb temperature and the dry-bulb temperature, and estimate the water supply time in response to the derived vaporizable amount, and supply water. This can reduce the amount of unnecessary water consumption, shorten the driving time of the water supply pump 913 or the recovery pump 923, and retard age deterioration due to the long-time driving. Alternatively, the thermocouple may be disposed downstream of the first vaporization filter 31 and the second vaporization filter 32 in the flow direction of the air passing through each of the first vaporization filter 31 and the second vaporization filter 32 to monitor a temperature individually, and water may be supplied to only one of the vaporization filters in which a temperature rise is found. This can also reduce the amount of unnecessary water consumption, shorten the driving time of the water supply pump 913 or the recovery pump 923, and retard age deterioration due to the long-time driving.

After stopping the driving of the water supply pump 913, the controller 130 stops the recovery pump 923 at a time point when the driving time of the recovery pump 923 becomes longer than the driving time of the water supply pump 913. The controller 130 controls the driving of the water supply pump 913 and the recovery pump 923 such that the driving time (P2) of the recovery pump 923 is longer than the driving time (P1) of the water supply pump 913 (P1<P2). As the driving time of the recovery pump 923 is set longer than the driving time of the water supply pump 913, water remaining in the drain pan 34 can be reliably recovered, the amount of water remaining in the housing 11 can be reduced, and the degree of hygiene in the housing 11 can be improved.

After stopping the driving of the recovery pump 923, the controller 130 starts the driving of the water supply pump 913. With the start of the driving of the water supply pump 913, the next driving cycle of the water supply pump 913 and the recovery pump 923 is started. This allows the water supply pump 913 and the recovery pump 923 to be intermittently driven and the controller 130 to continue the periodic drive control of the water supply pump 913 and the recovery pump 923. Various configurations can be adopted for this control. As an example, the water supply pump 913 may be driven for the driving time (P1) at a predetermined time regardless of the output timing of the recovery water sensor 924. This can prevent the water supply pump 913 from stopping in response to the output of the recovery water sensor 924 although the water is not sufficiently supplied. Specifically, when the water is not sufficiently supplied because the recovery water sensor 924 detects the supplied water flowing down along the first vaporization filter 31 and the second vaporization filter 32 which are under dry conditions, the water supply pump 913 can be prevented from stopping. In particular, it is effective at the first drive timing of the water supply pump 913 at start-up. That is, the driving time may be set such that the necessary and sufficient water can be supplied only at the first driving timing of the water supply pump 913 at start-up. Since the recovery pump 923 recovers the water from the inside of the air conditioner 1, sufficient cooling effect and drainage effect can be obtained even with the intermittent operation for a predetermined time.

FIG. 7 is a schematic perspective view of the cooling unit 3. The cooling unit 3 is housed in the housing 11 such that it is one-sided toward the inlets 5. The cooling unit 3 includes the first vaporization filter 31, the second vaporization filter 32, the water supply part 33, and the drain pan 34.

The water supply part 33 is provided above the first vaporization filter 31 and the second vaporization filter 32, and the drain pan 34 is provided below the first vaporization filter 31 and the second vaporization filter 32. The first vaporization filter 31 and the second vaporization filter 32 are sandwiched between the water supply part 33 and the drain pan 34 in the vertical direction.

The drain pan 34 is made of, for example, resin or metal, and has a dish shape having an opening surface facing upward. The drain pan 34 is bent in an L shape in a front view. The first vaporization filter 31 and the second vaporization filter 32 are placed in the regions corresponding to the respective sides of the L shape. The first vaporization filter 31 and the second vaporization filter 32 are fastened to the drain pan 34, and the drain pan 34 functions as a fastening member for fastening the first vaporization filter 31 and the second vaporization filter 32.

The drain pan 34 has, for example, two regions that are a first drain region corresponding to the first vaporization filter 31 and a second drain region corresponding to the second vaporization filter 32. The first drain region is provided with a hole for communicating with the first recovery water channel 921. The second drain region is provided with a hole for communicating with the second recovery water channel 922.

The first vaporization filter 31 and the second vaporization filter 32 include a rectangular filter element made of, for example, rayon, polyester, nonwoven fabric, or the like. The first vaporization filter 31 and the second vaporization filter 32 have water absorbability, and water (supply water) supplied from the tank 12 permeates throughout the first vaporization filter 31 and the second vaporization filter 32 (filter elements), thereby promoting vaporization of water.

The first vaporization filter 31 and the second vaporization filter 32 placed on and fastened to the L-shaped drain pan 34 extend in the form of an L. The angle between the first vaporization filter 31 and the second vaporization filter 32 disposed in an L shape is, for example, 60 degrees to 120 degrees. The first vaporization filter 31 and the second vaporization filter 32 are disposed in an L shape, so that the inside of the L shape is along a corner portion of the rectangular sensible heat exchanger 4. This improves the storability of the first vaporization filter 31 and the second vaporization filter 32, and contributes to the reduced size of the housing 11.

The water supply part 33 is made of, for example, resin and has a dish shape having an opening on the upper side. The water supply part 33 is bent in an L-shape in a front view similarly to the drain pan 34. The water supply part 33 is provided with a protruding pipe part 335 connected to the supply water channel 91. Water (supply water) that has passed through the pipe part 335 flows into the water supply part 33. The inner surface of the dish-shaped water supply part 33 is provided with grooves defined by ribs such that the supply water flows along the grooves.

Water (supply water) that has passed through the pipe part 335 is diverted by the grooves that branch into two channels. One of the channels corresponds to the first supply water channel 911, and the other corresponds to the second supply water channel 912. The first supply water channel 911 communicates with the first vaporization filter 31, and the second supply water channel 912 communicates with the second vaporization filter 32. The first supply water channel 911 and the second supply water channel 912, which are branched from the pipe part 335 connected to the supply water channel 91, extend with a constant width along the longitudinal direction of each of the first vaporization filter 31 and the second vaporization filter 32, and are shaped like a letter T.

The first supply water channel 911 is provided with first water supply holes 331 at an upper side portion (region) of the T shape, that is, a portion (region) extending in the longitudinal direction of the first vaporization filter 31, and the second supply water channel 912 is provided with second water supply holes 332 at an upper side portion (region) of the T shape, that is, a portion (region) extending in the longitudinal direction of the second vaporization filter 32. The first water supply holes 331 of the first supply water channel 911 are provided close to the first exit opening surface 441 facing the first vaporization filter 31, and are provided on the upstream side in the flow direction of the first air passing through the first vaporization filter 31. The second water supply holes 332 of the second supply water channel 912 are provided opposite to the second entrance opening surface 432 facing the second vaporization filter 32, and are provided on the upstream side where the second air passes through the second vaporization filter 32.

As the first water supply holes 331 and the second water supply holes 332 of the water supply part 33 are provided on the upstream side in the flow direction of the air (the first air and the second air) in this way, the density distribution of the water that has permeated into the first vaporization filter 31 and the second vaporization filter 32 can be shifted toward the upstream side. This facilitates vaporization of water in the first vaporization filter 31 and the second vaporization filter 32, and enhances the cooling efficiency. In addition, this reduces the possibility of a liquid splash phenomenon in which the water having permeated into the first vaporization filter 31 and the second vaporization filter 32 flows out in liquid form together with the first air and the second air.

A hydrophilic intervening member may be provided between the first water supply holes 331 and the first vaporization filter 31. Similarly, a hydrophilic intervening member may be provided between the second water supply holes 332 and the second vaporization filter 32. By providing the intervening member, water can be more uniformly supplied from the first water supply holes 331 to the first vaporization filter 31. Similarly, water can be more uniformly supplied from the second water supply holes 332 to the second vaporization filter 32. As a result, water can be efficiently supplied with a smaller amount of water, and the operation time of the water supply pump 913 and the recovery pump 923 can be reduced.

The cooling unit 3 including the first vaporization filter 31 and the second vaporization filter 32 is shaped like a letter L. This improves the storability of the cooling unit 3 in the housing 11, and contributes to the reduced size of the housing 11.

Figure 8:
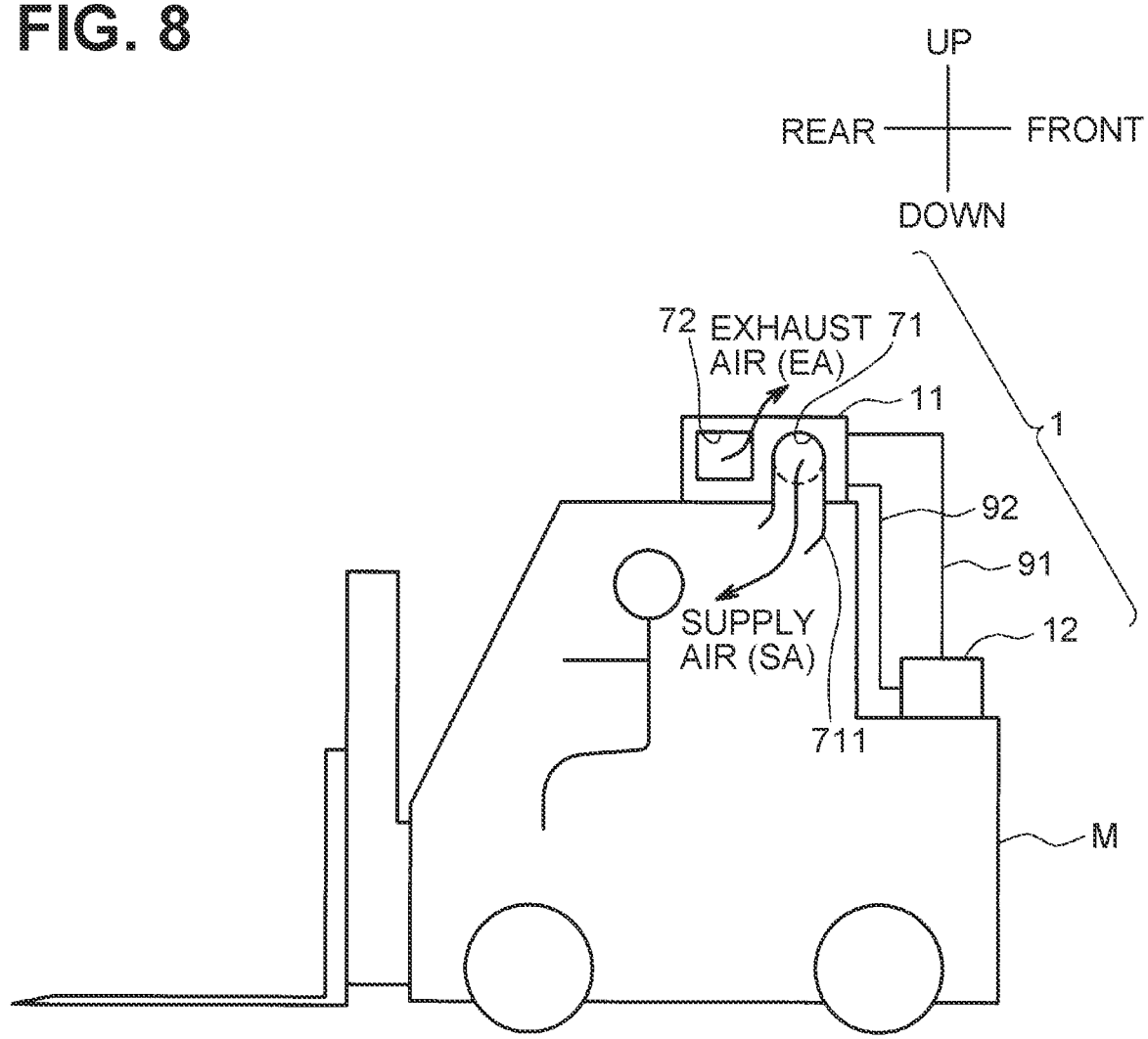
FIG. 8 is a schematic side view illustrating the air conditioner mounted on a moving object.

FIG. 8 is a schematic side view illustrating the air conditioner 1 mounted on the moving object M. The air conditioner 1 includes the housing 11 in which the cooling unit 3 is housed, and the tank 12 to store water to be supplied to the cooling unit 3. The air conditioner 1 is mounted on, for example, a vehicle (moving object M) such as a forklift. The moving object M may include various vehicles such as a golf cart, a small excavator, a turret, and a trike in addition to the forklift. In this case, the air conditioner 1 can be started simultaneously with the start of the vehicle by taking electric power from the vehicle side. Further, the power supply source can be shared with the vehicle.

The housing 11 is placed, for example, above a top surface (head guard) of the forklift. The tank 12 is placed at a position lower than the position where the housing 11 is placed, for example, at a rear surface portion (counterweight) of the forklift or at a pillar supporting the top surface (head guard) of the forklift. By placing the tank 12 below the housing 11, the water in the drain pan 34 housed in the housing 11 can be reliably collected in the tank 12 using gravity (the weight of the water), the amount of water remaining in the housing 11 can be reduced, and the degree of hygiene in the housing 11 can be improved.

All the electric components such as the water supply pump 913, the supply water sensor 914, the recovery pump 923, and the recovery water sensor 924 disposed in the supply water channel 91 and the recovery water channel 92 are housed in the housing 11, and these electric components are not mounted on the tank 12. Thus, the tank 12 can be simplified in structure and reduced in weight, and the degree of freedom in mounting the tank 12 when the air conditioner 1 is mounted on the moving object M such as a forklift can be improved.

The outlet duct 711 with which a blowout direction is adjustable is attached to the first outlet 71 provided in the housing 11, and the outlet duct 711 is extended below the top surface on which the housing 11 is placed. Thus, the second outlet 72 for blowing out the second air (exhaust air) can be located above the top surface, and the first air (supply air) can be blown out via the outlet duct 711 to the driver's seat of the forklift, which is the space to be air-conditioned, so as to provide cooling for the operator at the driver's seat of the forklift efficiently.

The blowing direction of the second outlet 72 for blowing the second air (exhaust air) is the vicinity of the periphery of the outlet duct 711. Thus, the temperature of the air around the outlet duct 711 can be lowered by the second air blown out from the second outlet 72. The temperature of the first air (supply air) blown out from the outlet duct 711 can be prevented from rising due to the outside air (air outside the housing 11).

The tank 12 and the housing 11 (cooling unit 3) communicate with each other through the supply water channel 91 and the recovery water channel 92. For example, the supply water channel 91 and the recovery water channel 92 defined by, for example, a hose made of a soft resin may be disposed along a pillar that supports the top surface. In a case where the supply water channel 91 and the recovery water channel 92 are disposed along a pillar, the supply water channel 91 and the recovery water channel 92 may be fastened to the pillar by a fastening member such as a cable tie. The supply water channel 91 and the recovery water channel 92 can be prevented from being detached from the tank 12 or the housing 11 due to vibration generated by traveling of the forklift.

An example in which the first vaporization filter 31 and the second vaporization filter 32 are provided in an L shape as illustrated in FIG. 3 has been described, but this is not limited thereto. It is only required that the first air flowing through the first channel 61 passes through the first vaporization filter 31 and the second air flowing through the second channel 62 passes through the second vaporization filter 32. For example, the first vaporization filter 31 may be formed so as to cover the first exit opening surface 441 in the first channel 61 defined between the left end portion of the first exit opening surface 441 and the front side surface of the housing 11. Similarly, the second vaporization filter 32 may be formed so as to cover the second entrance opening surface 432 in the second channel 62 defined between the right end portion of the second entrance opening surface 432 and the front side surface of the housing 11.

SECOND EMBODIMENT

Figure 9:
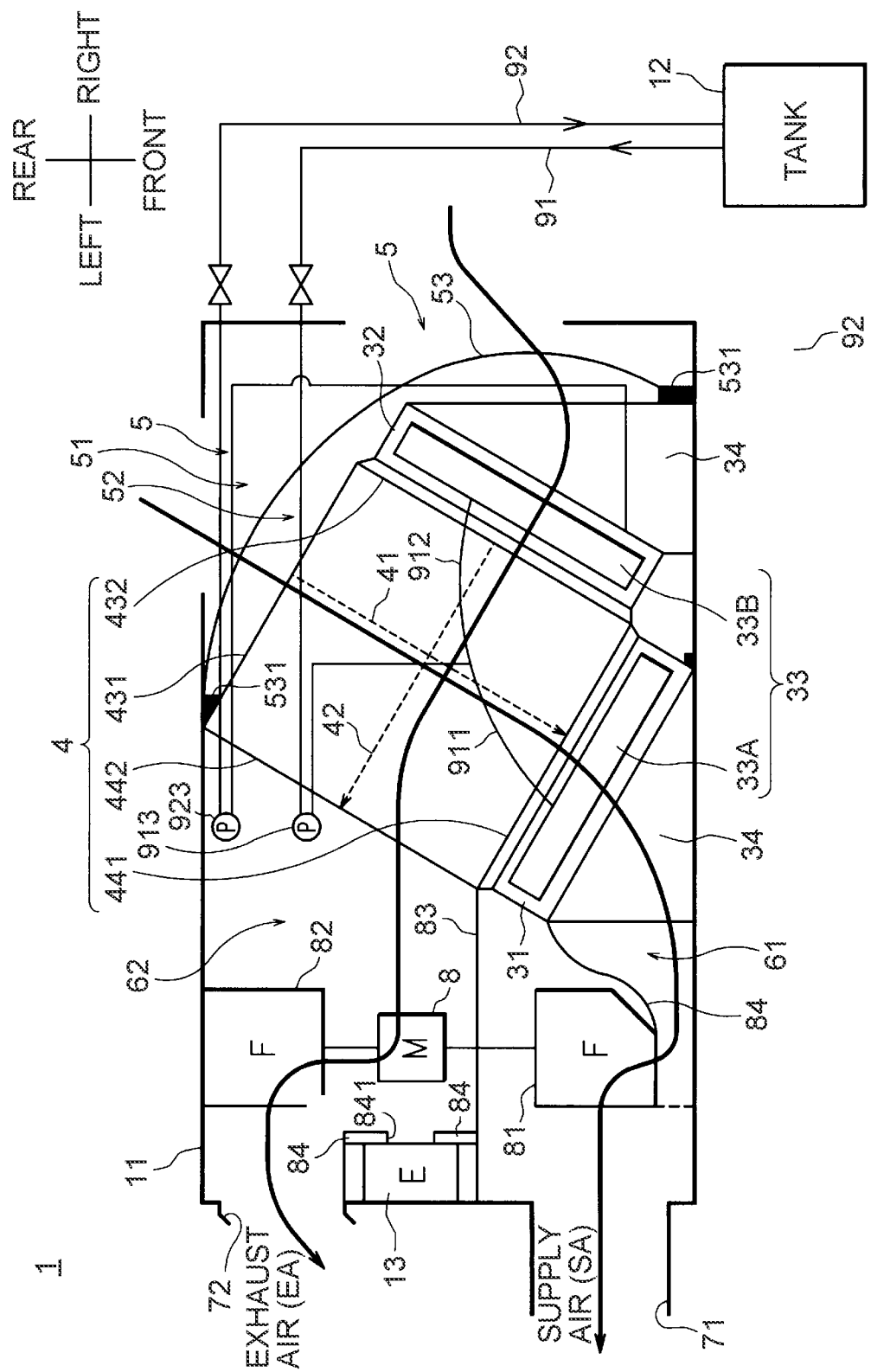
FIG. 9 is a schematic front view illustrating an air conditioner according to a second embodiment.
Figure 10:
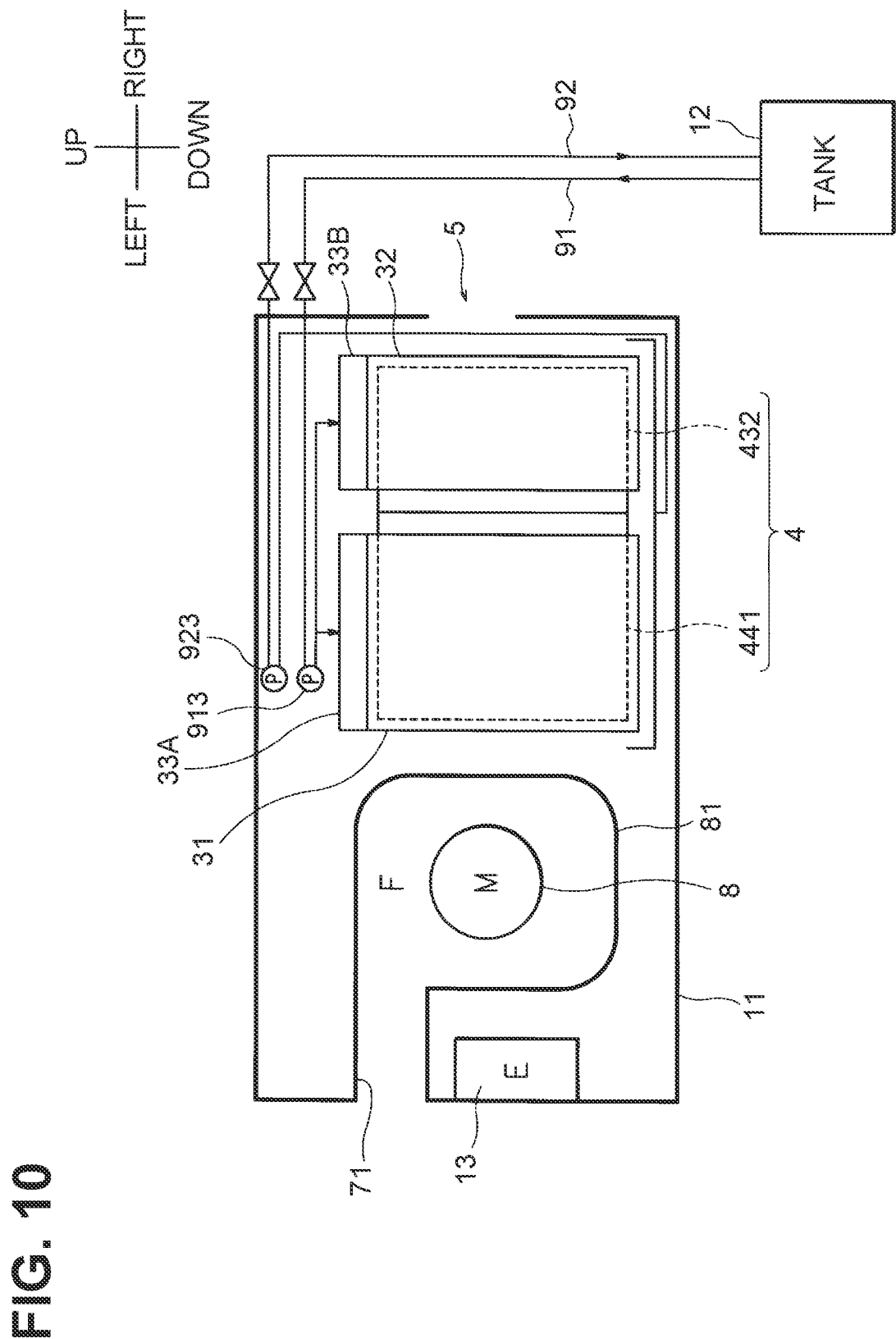
FIG. 10 is a schematic side view illustrating the air conditioner.

FIG. 9 is a schematic front view illustrating an air conditioner 1 according to a second embodiment. FIG. 10 is a schematic side view illustrating the air conditioner 1. FIG. 10 schematically illustrates the positional relationship when the air conditioner 1 is viewed from the front. FIG. 10 schematically illustrates a cross section taken along line B-B in FIG. 2 as viewed from the front. As with the first embodiment, the air conditioner 1 according to the second embodiment includes a housing 11, a tank 12, an electric unit 13, a cooling unit 3, a sensible heat exchanger 4, a fan motor 8, a first fan 81, a second fan 82, a water supply pump 913, and a recovery pump 923, and includes a first path through which first air flows and a second path through which the second air flows.

The cooling unit 3 according to the second embodiment includes a first vaporization filter 31, a second vaporization filter 32, a water supply part 33, and a drain pan 34, as with the first embodiment. The water supply part 33 of the second embodiment includes a first water supply part 33A mounted on an upper part of the first vaporization filter 31 and a second water supply part 33B mounted on an upper part of the second vaporization filter 32, and the first water supply part 33A and the second water supply part 33B are separately mounted on upper part of the first vaporization filter 31 and the upper part of the second vaporization filter 32, which is different from the first embodiment.

As illustrated in the drawings of the present embodiment, the water supply pump 913 and the recovery pump 923 are lined up above the sensible heat exchanger 4. As with the first embodiment, the water supply pump 913 is provided in the supply water channel 91. The housing 11 and the tank 12 communicate with the supply water channel 91 via, for example, stop valves.

The recovery pump 923 and the water supply pump 913 may be placed side by side above the sensible heat exchanger 4, and may be made accessible by opening the top plate of the housing 11. This can improve the efficiency of operations such as inspection and replacement of the recovery pump 923 and the water supply pump 913 at the time of maintenance of the air conditioner 1. Side by side placement of the water supply pump 913 and the recovery pump 923 eliminates the need to provide a placement space on each of the upper and lower sides, and the height of the housing 11 can be reduced to miniaturize the product.

The water (supply water) pumped up from the tank 12 by the water supply pump 913 is supplied to the water supply part 33 (the first water supply part 33A and the second water supply part 33B) via the supply water channel 91. The supply water channel 91 between the water supply pump 913 and the first water supply part 33A and the second water supply part 33B is provided with a branch channel that branches into a first supply water channel 911 and a second supply water channel 912. The branch channel may be located above the sensible heat exchanger 4. The first supply water channel 911 and the second supply water channel 912, which are branched by the branch channel defined in the supply water channel 91, are connected to the first water supply part 33A and the second water supply part 33B, respectively. That is, the first supply water channel 911 communicates with the first water supply part 33A, and the second supply water channel 912 communicates with the second water supply part 33B.

The first water supply part 33A and the second water supply part 33B are separated such that the first water supply part 33A corresponds to the first vaporization filter 31 and the second water supply part 33B corresponds to the second vaporization filter 32. In addition, the first supply water channel 911 and the second supply water channel 912, which are branched by the branch channel in the supply water channel 91, communicate with the first water supply part 33A and the second water supply part 33B, respectively, thereby preventing imbalance in the amount of water supplied between the first water supply part 33A and the second water supply part 33B from occurring. That is, the water (supply water) is divided at the branch channel located outside the first water supply part 33A and the second water supply part 33B. As a result, even when the air conditioner 1 mounted, for example, on the moving object M is inclined due to the behavior of the moving object M and thus a height difference occurs between the first water supply part 33A and the second water supply part 33B, a drift in the amount of water flowing into the first water supply part 33A and the second water supply part 33B can be prevented from occurring. Thus, even when the air conditioner 1 is mounted on the moving object M and the position of the air conditioner 1 changes due to the state of the road surface on which the moving object M moves, the amounts of water supplied to the first water supply part 33A and the second water supply part 33B can be equalized.

The water (supply water) flowing into the first water supply part 33A through the first supply water channel 911 is dripped from the first water supply holes 331 into the first vaporization filter 31 as with the first embodiment. The water (supply water) flowing into the second water supply part 33B through the second supply water channel 912 is dripped from the second water supply holes 332 into the second vaporization filter 32 as with the first embodiment.

As with the first embodiment, the water supply pump 923 is provided in the recovery water channel 92. The housing 11 and the tank 12 communicate with the recovery water channel 92 via, for example, stop valves. As with the first embodiment, the water (recovered water) that has flowed down to the drain pan 34 is recovered via the recovery water channel 92 in the tank 12.

The water that has flowed down from the first vaporization filter 31 and the second vaporization filter 32 may be collected at one place in the drain pan 34, joined as the recovery water channel 92, and connected to the recovery pump 923. That is, in the drain pan 34, the first recovery water channel 921 after the addition of the first vaporization filter 31 and the second recovery water channel 922 after the addition of the second vaporization filter 32 may be integrated into one place. With such a configuration, for example, even when the air conditioner 1 is mounted on a moving object and the housing 11 is inclined due to the behavior of the moving object, the water flowing down from the first vaporization filter 31 and the second vaporization filter 32 can be collected at one place of the drain pan 34, that is, a communication hole communicating with the recovery water channel 92, and the water can be reliably conveyed by the recovery pump 923. That is, for example, in a case where the drain pan 34 is provided with a plurality of communication holes, when the housing 11 is inclined, there is concern that air may be drawn from one of the communication holes by the recovery pump 923 and water may not be drawn from the other communication hole. However, as the water flowing down from the first vaporization filter 31 and the second vaporization filter 32 is collected in one place of the drain pan 34 and is conveyed via the recovery water channel 92 by the recovery pump 923, the water can be reliably recovered in the tank 12.

Figure 11:
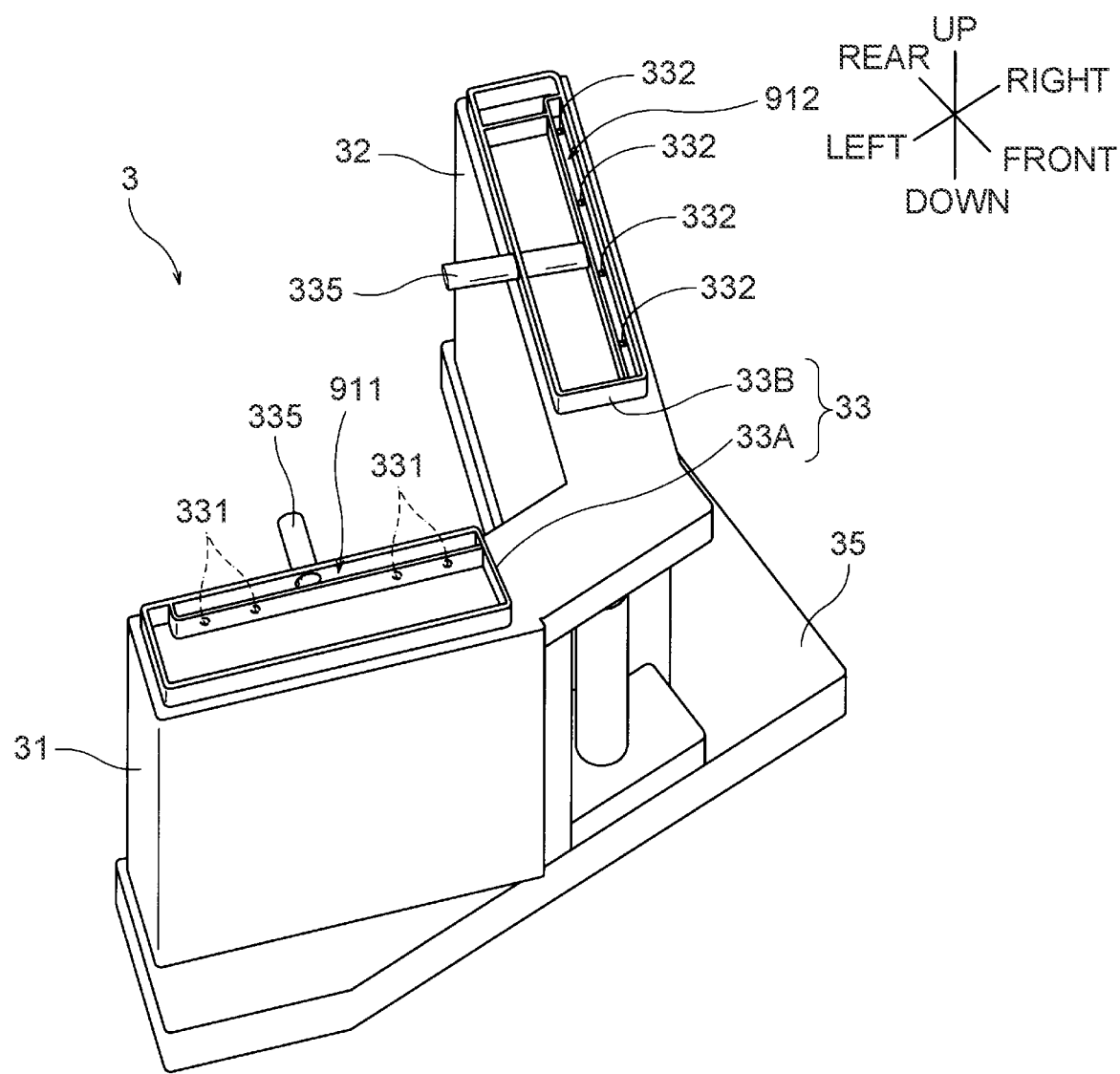
FIG. 11 is a schematic perspective view of a cooling unit.

FIG. 11 is a schematic perspective view of the cooling unit 3. Similarly to the first embodiment, the cooling unit 3 of the second embodiment includes the first vaporization filter 31, the second vaporization filter 32, the drain pan 34, and the water supply part 33, and the water supply part 33 includes the first water supply part 33A and the second water supply part 33B which are separately configured.

The drain pan 34 is shaped like a letter L, and the first vaporization filter 31 and the second vaporization filter 32 are placed in regions constituting respective sides of the L-shape. The first vaporization filter 31 and the second vaporization filter 32 are placed on the drain pan 34 and fastened in an L-shape.

The first water supply part 33A is placed on an upper part of the first vaporization filter 31, and the second water supply part 33B is placed on an upper part of the second vaporization filter 32. Thus, the first water supply part 33A and the second water supply part 33B are arranged in an L-shape, similar to the first vaporization filter 31 and the second vaporization filter 32. With such a configuration, the cooling unit 3 can have an L-shaped outer shell, which improves the storability of the cooling unit 3, and contributes to the reduced size of the housing 11 of the air conditioner 1.

Figure 12:
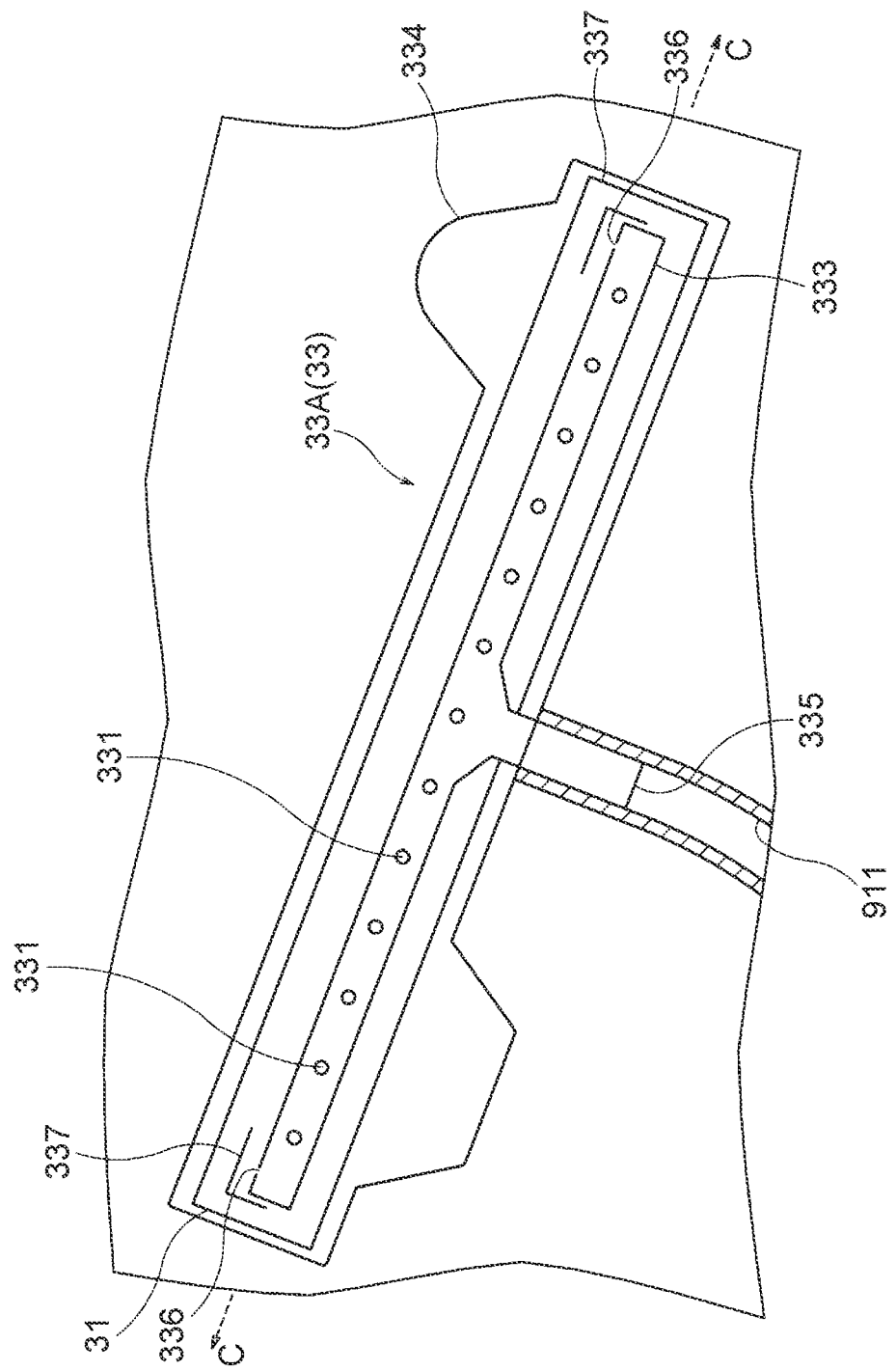
FIG. 12 is an illustration of a water supply part internal structure.
Figure 13:
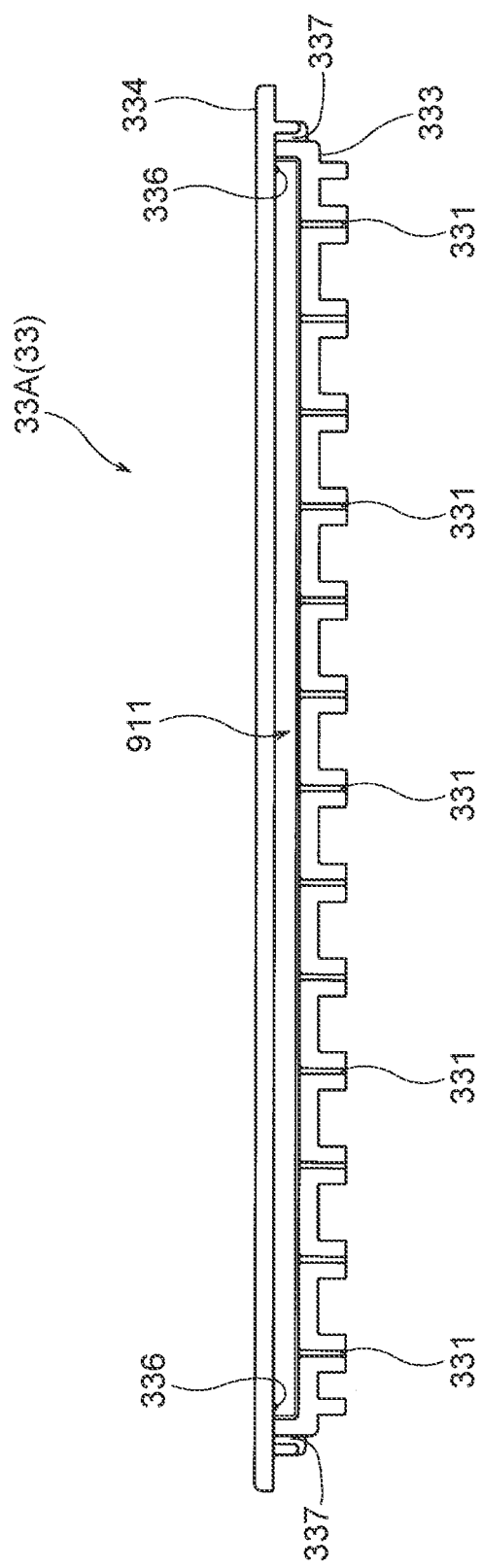
FIG. 13 is a schematic side view illustrating a water supply part.
Figure 14:
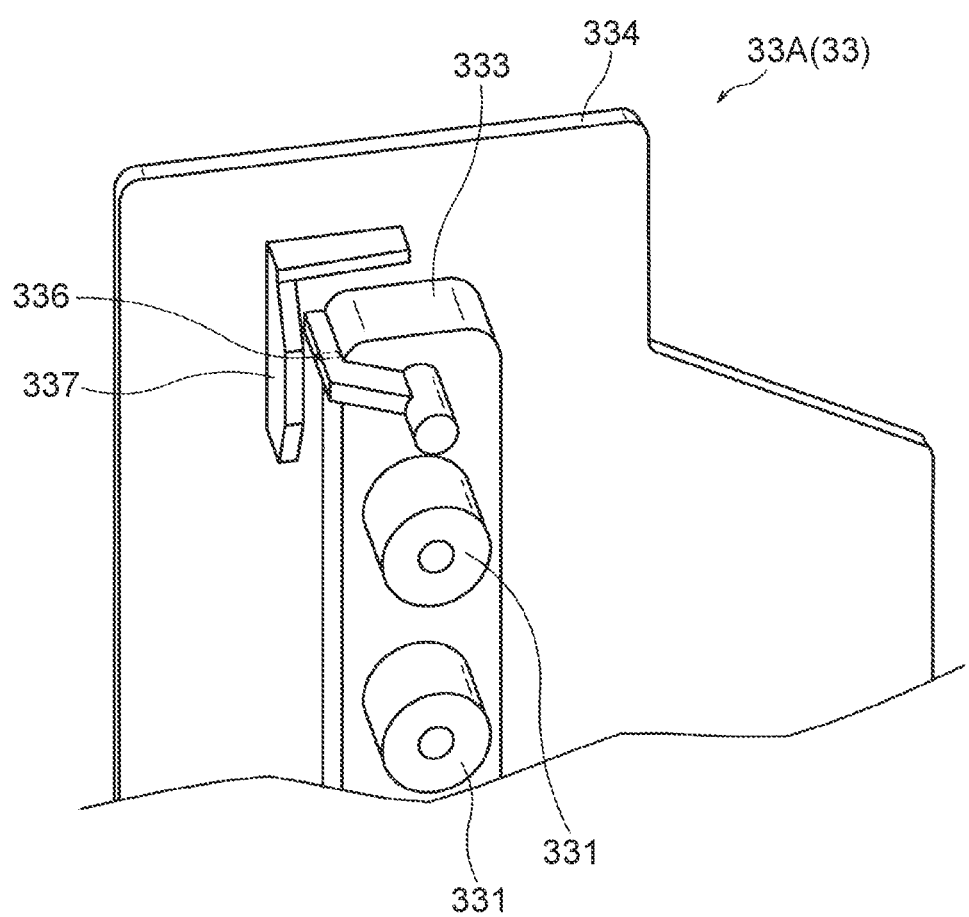
FIG. 14 is an illustration of a main part of the water supply part.

FIG. 12 is an illustration of the water supply part 33 internal structure. FIG. 13 is a schematic side view of the water supply part 33. FIG. 14 is an illustration of a main part of the water supply part 33. FIG. 12 is a top view of the water supply part 33, and FIG. 13 is a central cross-sectional view (cross-section taken along line C-C) of the water supply part 33 as viewed from the pipe part 335 side. The water supply part 33 illustrated in FIGS. 12 to 14 has a modified structure of the water supply part 33 illustrated in FIG. 11. In the drawings of the present embodiment, the structure of the first water supply part 33A will be described based on the first water supply part 33A constituting the water supply part 33. The structure of the second water supply part 33B is similar to the structure of the first water supply part 33A.

The first water supply part 33A forms a box having a hollow structure inside, and includes an oblong container part 333 into which supply water flows, and a rectangular top surface part 334 that seals the container part 333 from above. The top surface part 334A closes an opening surface located at the top of the container part 333, whereby the container part 333 is sealed and the first water supply part 33A having a hollow structure inside is defined.

The area of the top surface part 334 in a front view is larger than the opening area of the opening surface located at the upper portion of the container part 333, and the peripheral edge of the top surface part 334 is located outside the opening edge of the container part 333. Thus, a region where the container part 333 is provided and a peripheral region around the region where the container part 333 is provided below the lower surface of the top surface part 334.

A tubular pipe part 335 is provided in a central portion of a side surface of the container part 333, and the pipe part 335 communicates with a first supply water channel 911. The supply water flowing through the first supply water channel 911 flows via the pipe part 335 into the container part 333.

That is, the internal space in the pipe part 335 and the container part 333 of the first water supply part 33A constitutes a part of the first supply water channel 911. The container part 333 is provided along the longitudinal direction of the first vaporization filter 31 on which the first water supply part 33A is placed, and the container part 333 and the pipe part 335 protruding from the side surface of the container part 333 form a T-shaped water channel. The T-shaped water channel forms a part of the first supply water channel 911.

A plurality of (13 in the drawing) first water supply holes 331 are provided in the bottom surface of the container part 333 along the longitudinal direction of the container part 333, as with the first embodiment. That is, the first water supply holes 331 are provided along the longitudinal direction of the first vaporization filter 31 on which the first water supply part 33A is placed. As an example, the first water supply holes 331 are arranged in the longitudinal direction in point symmetry with respect to the first water supply hole 331 provided at the center of the container part 333. The container part 333 is disposed on an upstream side of the first air passing through the first vaporization filter 31, and the first water supply holes 331 provided in the container part 333 may be located to the upstream side of the first air.

Vent holes 336 are provided at both ends in the longitudinal direction of the container part 333. The vent holes 336 are provided passing through the side surface of the container part 333, and are formed above the first water supply holes 331 provided in the bottom surface. As an example, the vent holes 336 are provided at the top of the container part 333. Further, the opening area of the vent hole 336 is smaller than the opening area of the first water supply hole 331. Thus, air having a specific gravity smaller than that of water can be preferentially discharged from the vent holes 336. In other words, most of the supply water is dripped from the first water supply holes 331 into the first vaporization filter 31. As an example, the side surface in which the vent holes 336 are provided is a side surface located opposite to the side surface on which the pipe part 335 is provided. A passing-through direction of the vent hole 336 provided through the side surface forms an angle of 90° with a passing-through direction of the first water supply hole 331 provided in the bottom surface, that is, the passing-through direction of the vent hole 336 is different from the passing-through direction of the first water supply hole 331.

Since the container part 333 is sealed by the top surface part 334, there is a concern that air may remain inside the container part 333 (first water supply part 33A). However, since the vent holes 336 are formed above the first water supply holes 331, the air remaining in the upper part of the container part 333 can be efficiently discharged. The vent hole 336 is provided at each of both ends in the longitudinal direction of the container part 333, and the pipe part 335 is provided at the central portion in the longitudinal direction of the container part 333. Thus, when water flows into the container part 333 from the pipe part 335 positioned at the central portion, air gathered to both ends by the water can be efficiently discharged from the vent holes 336. As an example, a cutout portion defined in a wall portion of the container part 333 and the top surface part 334 may face each other to form the vent hole 336. Alternatively, the vent hole 336 may be defined by providing a recessed portion slightly larger than the wall surface of the container part 333 in the top surface part 334 and sealing the container part 333 with the top surface part 334.

The lower surface of the top surface part 334 which seals the container part 333 from above includes a region where the container part 333 is provided and a peripheral region which is the periphery of the region where the container part 333 is provided. A water receiving wall 337 for receiving water flowing (ejecting) out from the vent hole 336 is provided in the peripheral region.

The water receiving wall 337 is provided protruding from the lower surface of the top surface part 334 downward, that is, toward the first vaporization filter 31. The water receiving wall 337 is formed of, for example, a rib and has an L-shape. By forming the water receiving wall 337 in an L-shape, the rigidity of the water receiving wall 337 can be improved. Further, by forming the water receiving wall 337 in an L-shape, the supplied water splashing against the water receiving wall 337 opposed to the vent hole 336 can be received by the L-shaped portion, and can be reliably dripped into the first vaporization filter 31. In the L-shaped water receiving wall 337, a wall surface corresponding to the long side of the L shape is provided so as to be perpendicular to the passing-through direction of the vent hole 336. A wall surface corresponding to the short side of the L shape is provided so as to be parallel to the passing-through direction of the vent hole 336. The L-shaped water receiving wall 337 is provided along a corner part of a rectangular container part 333 with the inside of the L-shape facing the corner part.

The vent hole 336 provided passing through the side surface of the container part 333 has an inner opening end part of the container part 333 and an outer opening end part of the container part 333. The wall surface corresponding to the long side of the L-shaped water receiving wall 337 is perpendicular to the passing-through direction of the vent hole 336, that is, the wall surface is provided facing the outer opening end part of the vent hole 336. Thus, the water flowing (ejecting) out from the vent hole 336 hits the wall surface corresponding to the long side of the L-shaped water receiving wall 337, is received by the wall surface, and is then guided downward in the protruding direction of the wall surface. Since the first vaporization filter 31 is provided below the wall surface, that is, below the first water supply part 33A, the water guided downward is dripped into the first vaporization filter 31. Thus, even when the volumetric flow rate of the water (supply water) supplied to the first water supply part 33A is higher than the volumetric flow rate of the water dripped from the first water supply hole 331 into the first vaporization filter 31, the water can be drained (caused to flow out) from the vent hole 336. The water that has flowed out from the vent hole 336 is guided downward by the water receiving wall 337, and can be dripped into the first vaporization filter 31.

The wall surface corresponding to the long side of the L-shaped water receiving wall 337 is formed in a shape tapered downward in the protruding direction, for example, a V shape or a U shape. Thus, in the wall surface, the tip end portion of the tapered shape corresponds to the lowermost portion of the water receiving wall 337, and water can be efficiently dripped into the first vaporization filter 31 from the tip end portion of the tapered shape. Further, some of the supplied water hitting the water receiving wall 337 rebounds and adheres to the outer wall of the container part 333. Further, some of the supplied water runs along the outer wall of the container part 333 from the vent hole 336. Thus, as illustrated in FIG. 14, a rib extending downward from the vent hole 336 on the wall surface of the container part 333 may be provided. In the example of FIG. 14, the lowermost portion of the rib is located in a straight line connecting the first water supply holes 331. This enables the dispersed dripping positions of the supply water with respect to the first vaporization filter 31 to eliminate the imbalance in the distribution of the supply water in the first vaporization filter 31.

The structure of the second water supply part 33B is similar to the structure of the first water supply part 33A. Similarly to the first water supply part 33A, the second water supply part 33B includes a container part 333 and a top surface part 334, the container part 333 is provided with a pipe part 335, second water supply holes 332, and vent holes 336, and water receiving walls 337 are provided protruding from the lower surface of the top surface part 334. The structure related to the second water supply part 33B will be described by replacing the description related to the first water supply part 33A with the description related to the second water supply part 33B.

At the branch channel in the supply water channel 91 from which the first supply water channel 911 and the second supply water channel 912 are branched, the amounts of water supplied to the first water supply part 33A and the second water supply part 33B per unit time may be different from each other. The amount of water supplied to the first water supply part 33A may be smaller than the amount of water supplied to the second water supply part 33B. That is, the amount of water supplied to the first vaporization filter 31 may be smaller than the amount of water supplied to the second vaporization filter 32. To differentiate between the amounts of water supplied to the first water supply part 33A and the second water supply part 33B in this manner, for example, the inside diameter of the first supply water channel 911 branched at the branch channel in the supply water channel 91 may be smaller than the inside diameter of the second supply water channel 912. Alternatively, the inside diameter of the pipe part of the first water supply part 33A to which the first supply water channel 911 is connected may be smaller than the inside diameter of the pipe part of the second water supply part 33B to which the second supply water channel 912 is connected. Since the first air passing through the first vaporization filter 31 is cooled by the second air in the sensible heat exchanger 4, the saturated water vapor pressure of the first air is lowed. In contrast, the second air passing through the second vaporization filter 32 is air immediately after being taken in from the inlets 5. Thus, the saturated water vapor pressure of the first air passing through the first vaporization filter 31 is lower than the saturated water vapor pressure of the second air passing through the second vaporization filter 32. That is, the vaporization amount of the first air in the first vaporization filter 31 per unit time is smaller than the vaporization amount of the second air in the second vaporization filter 32 per unit time. Thus, by setting the amount of water supplied to the first vaporization filter 31 to be smaller than the amount of water supplied to the second vaporization filter 32, excessive water can be prevented from being supplied to the first vaporization filter 31, thus enabling the reduction of summation of drive amount of the water supply pump 913, improving of the product life, and the reduction of the power consumption.

For example, an electromagnetic three-way valve may be provided at the branch channel in the supply water channel 91 to alternately supply water to the first vaporization filter 31 via the first water supply part 33A and to the second vaporization filter 32 via the second water supply part 33B. With such a configuration, the flow rate of water supplied at a time by the water supply pump 913 can be reduced by half, and the life of the water supply pump 913 can be extended. Alternatively, the water supply pump 913 can be downsized, and cost reduction and downsizing of the air conditioner 1 (the entire product) can be achieved. The opening and closing of each valve of the electromagnetic three-way valve is controlled by, for example, the controller 130. When controlling the electromagnetic three-way valve, the controller 130 may set the time to open a port connected to the first supply water channel 911 shorter than the time to open a port connected to the second supply water channel 912, thereby setting the amount of water supplied to the first vaporization filter 31 smaller than the amount of water supplied to the second vaporization filter 32.

An electromagnetic three-way valve may be provided that can switch between a path for recovering (discharging) the water in the drain pan 34 to the tank 12 and a path for supplying water to the first vaporization filter 31 and the second vaporization filter 32 without recovering (discharging) the water to the tank 12. The controller 130 drives the water supply pump 913 to supply water from the tank 12 until the maximum amount of water is stored in the drain pan 34, and then circulates the water between the drain pan 34 and the first vaporization filter 31 and the second vaporization filter 32 to supply the water in the drain pan 34 to the first vaporization filter 31 and the second vaporization filter 32. After the circulation, when the first vaporization filter 31 and the second vaporization filter 32 are sufficiently wetted, the water in the drain pan 34 is recovered (discharged) and returned to the tank 12. Since only the water stored in the drain pan 34 is circulated, the water temperature can be easily cooled to the wet-bulb temperature, and the water cooling effect can be obtained to improve the cooling performance.

Supplementary Note 1: Air Conditioner 1 in General

The air conditioner 1 includes two channels of the first channel 61 and the second channel 62, and the sensible heat exchanger 4 to exchange sensible heat between first air and second air flowing in the channels. The air conditioner 1 further includes the first vaporization filter 31 and the second vaporization filter 32. The first air passing through the first vaporization filter 31 is cooled by latent heat (vaporization heat) of water permeating the first vaporization filter 31, and the second air passing through the second vaporization filter 32 is cooled by vaporization heat of water permeating the second vaporization filter 32. Since the second vaporization filter 32 is provided upstream of the sensible heat exchanger 4 in the flow direction of the second air, the second air is cooled by the vaporization heat and then flows into the sensible heat exchanger 4. The first air flowing into the sensible heat exchanger 4 exchanges heat with the second air cooled by the second vaporization filter 32 via the sensible heat exchanger 4, and is cooled. The first air that has flowed out of the sensible heat exchanger 4 is further cooled by the first vaporization filter 31 provided downstream of the sensible heat exchanger 4 in the flow direction of the first air, and then blown out as supply air (SA) from the first outlet 71 to the space to be air-conditioned. Thus, since the air conditioner 1 cools the first air blown out to the space to be air-conditioned in two steps, the first air efficiently cooled can be used to efficiently cool the space to be air-conditioned. The air conditioner 1 configured as described above includes the first channel 61 and the second channel 62 which are different from each other, the first vaporization filter 31 is provided in the first channel 61, and the second vaporization filter 32 is provided in the second channel 62. By using the first vaporization filter 31 and the second vaporization filter 32 as cold energy sources, the first air can be efficiently cooled. Of the first vaporization filter 31 and the second vaporization filter 32, the first air blown out to the space to be air-conditioned as the supply air (SA) passes through the first vaporization filter 31, which can prevent an increase in the absolute humidity of the first air to cool the first air efficiently. The water for generating the vaporization heat is supplied to the first vaporization filter 31 and the second vaporization filter 32, and is not directly supplied to the sensible heat exchanger 4. Thus, water droplets can be prevented from remaining in the first path 41 and the second path 42 inside the sensible heat exchanger 4.

The first vaporization filter 31 and the second vaporization filter 32 are fastened in an L-shape by the fastening member, which improves the storability in housing in the housing 11, and contributes to the reduced size of the housing 11.

The air conditioner 1 uses the L-shaped drain pan 34, which is provided below the first vaporization filter 31 and the second vaporization filter 32, as the fastening member, thereby eliminating the need for a dedicated component for fastening the first vaporization filter 31 and the second vaporization filter 32, and reducing the size and weight of air conditioner 1.

The sensible heat exchanger 4 is housed in the housing 11 such that an inner surface of the housing 11 and an end surface of the sensible heat exchanger 4 facing the inner surface form an acute angle in a range of, for example, 10 degrees to 50 degrees. As the sensible heat exchanger 4 is housed in the housing 11 in a state where the sensible heat exchanger 4 is rotated at the predetermined rotation angle as described above, the sensible heat exchanger 4 can have a larger area for heat exchange (heat exchange area) with respect to the size of housing 11.

The sensible heat exchanger 4 includes the first path 41 through which the first air flows and the second path 42 through which the second air flows. Thus, the first path 41 constitutes a part of the first channel 61, and the second path 42 constitutes a part of the second channel 62. The first vaporization filter 31 covers the first exit opening surface 441 in which the exit of the first path 41 is defined so that all of the first air flowing out from the exit of the first path 41 passes through the first vaporization filter 31. The second vaporization filter 32 covers the second entrance opening surface 432 in which the entrance of the second path 42 is defined so that all the second air flowing into the entrance of the second path 42 passes through the second vaporization filter 32. With such a configuration, the flow rate of the air bypassing the first vaporization filter 31 or the second vaporization filter 32 without passing therethrough can be reduced.

The first path 41 and the second path 42 of the sensible heat exchanger 4 intersect, whereby a crossflow is formed between the first air and the second air. The angle formed by an end surface of the first vaporization filter 31 and an end surface of the second vaporization filter 32 each facing the sensible heat exchanger 4 is greater than or equal to the angle of intersection between the first path 41 and the second path 42, and is, for example, 60 degrees to 120 degrees. The sensible heat exchanger 4 may have a diamond shape, and the angle of intersection between the first path 41 and the second path 42 of the sensible heat exchanger 4 may be any angle from 60 degrees to 120 degrees other than 90 degrees. In this case, the angle formed by the end surfaces of the first vaporization filter 31 and the second vaporization filter 32 may be ±30 degrees with respect to the angle of intersection. Thus, the first vaporization filter 31 and the second vaporization filter 32 fastened by the fastening member can be disposed such that the inside of the L shape defined by the end surfaces of the first vaporization filter 31 and the second vaporization filter 32 faces to the corner portion of the rectangular sensible heat exchanger 4, which improves the storability of these filters and other components and contributes to the reduced size of the housing 11.

The sensible heat exchanger 4 is housed in the housing 11 such that the surface-to-surface distance between the first exit opening surface 441 of the sensible heat exchanger 4 and the inner surface of the housing 11 facing the first exit opening surface 441 increases downstream in the flow direction of the first air. Thus, the channel cross-sectional area of the first channel 61 located on the downstream side of the exit of the first path 41 provided in the first exit opening surface 441 can be gradually increased toward the downstream side, and the pressure drop with respect to the first air flowing out from the exit of the first path 41 can be reduced.

The dust collecting filter 53 disposed between the inlets 5 and the sensible heat exchanger 4 is curved so as to cover the entrance of the first path 41 and the entrance of the second path 42 of the sensible heat exchanger 4. Thus, the number of components in the air conditioner 1 can be reduced by sharing the dust collecting filter 53 between the first channel 61 and the second channel 62. Even when the entrance of the first path 41 and the entrance of the second path 42 are provided on different end surfaces of the sensible heat exchanger 4, the single dust collecting filter 53 is curved to cover the entrances of both the first path 41 and the second path 42, thereby preventing the dust from entering the inside of the sensible heat exchanger 4.

The sealing member 531 is provided at each end portion of the dust collecting filter 53, thus preventing the air from flowing into the sensible heat exchanger 4 without passing through the dust collecting filter 53.

In the air conditioner 1, a space between the sensible heat exchanger 4 and the inlets 5 is divided into an upstream space and a downstream space in a flow direction of first air and second air by the dust collecting filter 53, and the branch channel 52 branching into the first path 41 and the second path 42 is defined in the downstream space. Thus, while the first path 41 and the second path 42 share the inlets 5 and the dust collecting filter 53, the first path 41 through which the first air flows and the second path 42 through which the second air flows are branched in the downstream space downstream of the dust collecting filter 53, and the diverted first air and second air can efficiently flow into the sensible heat exchanger 4. The upstream space is a space through which the intake air before being branched into the first air and the second air flows, and corresponds to the intake channel 51. The intake channel 51 (upstream space) communicates with the outside of the housing 11 via the inlets 5. Since the intake channel 51 (upstream space) is a path shared by the first path 41 and the second path 42, the inlets 5 can also be shared by the first path 41 and the second path 42, the degree of freedom in providing the hole-shaped inlets 5 in the housing 11 can be improved, the strength of the housing 11 can be secured, and the channel resistance (pressure drop) in the intake air can be reduced by increasing the opening areas of the inlets 5.

The upstream space corresponds to the intake channel 51 through which the intake air taken in from the inlets 5 flows, and the temperature of the intake air is equivalent to the temperature of the ambient air outside the housing 11. The water flowing through the supply water channel 91 located in the upstream space (intake channel 51) undergoes heat exchange with the intake air flowing through the intake channel 51. For example, when the temperature of the water flowing through the supply water channel 91 is higher than the temperature of the ambient air, the water is cooled by the intake air, and the cooling efficiency of the air conditioner 1 can be improved. The outer peripheral surface of the supply water channel 91 disposed in the upstream space may be provided with, for example, fins to increase the heating surface area on which heat is exchanged with the intake air, thereby improving the heat transfer efficiency.

The housing 11 is provided with the door portion 111, which is configured to be openable and closable, in the side surface to which the first vaporization filter 31 is provided. Thus, by opening the door portion 111, the inside of the housing 11 can be accessed from the outside, and maintenance work such as replacement of the first vaporization filter 31 or the second vaporization filter 32 can be performed. Since the inner surface of the door portion 111 is provided with the blocking member 112 to block entry of air, not passing through the first vaporization filter 31, into the first channel 61, air that has not been cooled by the first vaporization filter 31 can be prevented from entering the first channel 61 on the downstream side of the first vaporization filter 31. The blocking member 112 being provided on the inner surface of the door portion 111 includes not only the blocking member 112 affixed to the inner surface of the door portion 111, but also the blocking member 112 affixed to the first vaporization filter 31 or a fastening member that fastens the first vaporization filter 31 and the second vaporization filter 32, for example. In this case, when the door portion 111 is closed, the inner surface of the door portion 111 may press the blocking member 112 to prevent the air from entering the first channel 61 without passing through the first vaporization filter 31.

In the air conditioner 1, the tank 12 for holding water to be supplied to the first vaporization filter 31 and the second vaporization filter 32 is provided outside the housing 11, thereby eliminating the need for storage of the tank 12 in the housing 11 and thus reducing the size and weight of the housing 11. Thus, when the air conditioner 1 is, for example, mounted on the moving object M such as a forklift, the housing 11 serving as the main body of the air conditioner 1 and the tank 12 configured as a separate body from the housing 11 can be placed apart from each other, and the housing 11 and the tank 12 can be mounted according to a shape such as the outer shape of the moving object M on which the air conditioner 1 is mounted. The tank 12, the supply water channel 91, the first vaporization filter 31 and the second vaporization filter 32, and the recovery water channel 92 define a circulation circuit to recover water in the tank 12. The circulation circuit efficiently recovers water, which has not vaporized at the first vaporization filter 31 and the second vaporization filter 32, in the tank 12, and thus reduces the amount of the water remaining in the housing 11. As to the water permeating the first vaporization filter 31 and the second vaporization filter 32, the stop button, for example, may be pressed by the operator of the air conditioner 1 to perform a non-water supply operation in which the fans are driven with no water supplied from the tank 12, thereby drying the first vaporization filter 31 and the second vaporization filter 32.

Supplementary Note 2: Configuration of Cooling Unit 3

The cooling unit 3 is used for the air conditioner 1 for cooling a space to be air-conditioned, and includes the first vaporization filter 31 for cooling first air to be blown into the space to be air-conditioned by latent heat of water, and the second vaporization filter 32 for cooling second air subjected to sensible heat exchange with the first air by latent heat of water, and the first vaporization filter 31 and the second vaporization filter 32 are fastened in an L-shape by the fastening member.

Since the first vaporization filter 31 and the second vaporization filter 32 included in the cooling unit 3 are fastened in an L shape by the fastening member, the storability can be improved, and the housing 11 of the air conditioner 1 housing the cooling unit 3 can be downsized.

Supplementary Note 3: Cooling of Electric Unit 13

The air conditioner 1 includes the housing 11 having the first outlet 71 and the second outlet 72, the first channel 61 communicating with the first outlet 71 and through which first air cooled by latent heat of water flows, the second channel 62 communicating with the second outlet 72 and through which second air cooled by latent heat of water flows, and the electric unit 13 housed in the housing 11. The electric unit 13 is provided facing the second channel 62 to be cooled by the second air subjected to sensible heat exchange with the first air.

The air conditioner 1 includes the first channel 61 in which first air cooled by latent heat of water flows, and the second channel 62 in which second air cooled by latent heat of water flows, and blows out the first air cooled by using vaporization heat of water as supply air from the first outlet 71 to the space to be air-conditioned. Since the electric unit 13, which is housed in the housing 11 of the air conditioner 1 and becomes a heat generation source by consuming electric power, is provided facing the second channel 62 through which the second air flows, the electric unit 13 can be cooled by the second air. Since the second air for cooling the electric unit 13 is the second air subjected to the sensible heat exchange with the first air, the electric unit 13 can be cooled by using the cold heat of the second air blown out as the exhaust air from the second outlet 72. Thus, the electric unit 13 can be efficiently cooled without affecting the first air blown out from the first outlet 71 as the supply air.

Supplementary Note 4: Moving Object M, Pump Control

The air conditioner 1 includes the cooling unit 3 for cooling air blown out to a space to be air-conditioned by latent heat of water, the housing 11 for housing the cooling unit 3, and the tank 12 provided outside the housing 11 for storing water to be supplied to the cooling unit 3, and the housing 11 and the tank 12 are connected by a water channel through which the water flows.

The tank 12 for storing water to be supplied to the cooling unit 3 is provided outside the housing 11 for housing the cooling unit 3, and the tank 12 and the housing 11 are connected to each other by a water channel configured as, for example, a hose made of a soft resin or a pipe made of a hard resin. That is, the tank 12 is configured as a separate body from the housing 11 corresponding to the main body of the air conditioner 1. Thus, the weight of the housing 11 (the main body of the air conditioner 1) can be reduced, and the degree of freedom in placing the housing 11 at any place can be improved. Furthermore, the housing 11 and the tank 12 constituting the air conditioner 1 can be placed apart from each other, and the degree of freedom in placing the air conditioner 1 can be improved.

The housing 11 and the tank 12 are placed on the moving object M, and a portion of the moving object M on which the tank 12 is placed is positioned below a portion of the moving object M on which the housing 11 is placed.

When the air conditioner 1 is mounted on a moving object M that is a vehicle such as a forklift or a tractor, the housing 11 and the tank 12 are spaced apart from each other and are mounted on different portions of the moving object M. Since the portion of the moving object M on which the tank 12 is placed is positioned below the portion of the moving object M on which the housing 11 is placed, even the unvaporized water remaining inside the housing 11 can be recovered in the tank 12 by gravity. Thus, the amount of water remaining in the housing 11 can be reduced, and the degree of hygiene in the housing 11 can be improved. By placing the tank 12 below the housing 11, the accessibility to the tank 12 can be improved, and the work of replenishing the tank 12 with water can be facilitated.

The moving object M is a forklift, the portion of the moving object M on which the housing 11 is placed is the top of a head guard of the forklift, and the portion of the moving object M on which the tank 12 is placed is the top of a counterweight of the forklift.

When the air conditioner 1 is mounted on a forklift, the housing 11 is mounted on the top of a head guard of the forklift, and the tank 12 is mounted on the top of a counterweight of the forklift. The counterweight corresponds to a portion having a high ratio in the weight distribution of the forklift, and the tank 12 placed on the counterweight is placed at a position closer to the center of gravity of the forklift than the housing 11 placed on the head guard. This can reduce the liquid surface of the tank 12 from moving due to the vibration associated with the movement of the moving object M, efficiently supplying water from the tank 12 to the cooling unit 3.

The housing 11 is provided with the outlet duct 711 extending toward the space around the operator in the moving object M, which is the space to be air-conditioned.

Since the outlet duct 711 provided to the housing 11 is extended toward the space around the operator in the moving object M, even when the housing 11 is placed on any part of the moving object M, the cooled air can be blown out through the outlet duct 711 to the space around the operator in the moving object M.

The water channel includes the supply water channel 91 for supplying water to the cooling unit 3 and the recovery water channel 92 for recovering water not vaporized in the cooling unit 3, and the tank 12, the supply water channel 91, the cooling unit 3, and the recovery water channel 92 define a circulation circuit in which water circulates.

The water channel connecting the housing 11 and the tank 12 includes the supply water channel 91 for supplying water to the cooling unit 3 and the recovery water channel 92 for recovering water not vaporized in the cooling unit 3, and a circulation circuit is defined in which water circulates from the tank 12 as a starting point through the tank 12, the supply water channel 91, the cooling unit 3, and the recovery water channel 92 in this order. That is, the air conditioner 1 having the circulation circuit can recover the water which is not vaporized in the cooling unit 3 in the tank 12 and supply the water which is not vaporized to the cooling unit 3 again to reduce the number of times of replenishing the water into the tank 12 by reducing the consumption amount of the water.

The cooling unit 3 includes the first vaporization filter 31 for cooling first air blown out as supply air to the space to be air-conditioned, and the second vaporization filter 32 for cooling second air blown out as exhaust air to the outside of the housing 11 after sensible heat exchange with the first air, and the circulation circuit includes the branch channel branching into a water channel via the first vaporization filter 31 and a water channel via the second vaporization filter 32.

Since the air conditioner 1 includes the two vaporization filters, i.e., the first vaporization filter 31 for cooling the first air and the second vaporization filter 32 for cooling the second air, the cooling capacity can be improved. The circulation circuit includes a branch channel that branches into a water channel (the first supply water channel 911, the first recovery water channel 921) passing through the first vaporization filter 31 and a water channel (the second supply water channel 912, the second recovery water channel 922) passing through the second vaporization filter, and a merging channel at which the branched water channel passing through the first vaporization filter 31 merges with the branched water channel passing through the second vaporization filter. Thus, since the parallel channel including the water channel communicating with the first vaporization filter 31 and the water channel communicating with the second vaporization filter 32 is configured as a part of the circulation circuit, water can be efficiently supplied to the first vaporization filter 31 and the second vaporization filter 32.

The water supply pump 913 for conveying water flowing in the supply water channel 91 and the recovery pump 923 for conveying water flowing in the recovery water channel 92 are provided.

Since the air conditioner 1 includes the water supply pump 913 provided in the supply water channel 91 and the recovery pump 923 provided in the recovery water channel 92, water flowing through the supply water channel 91 and the recovery water channel 92 can be reliably conveyed even when the air conditioner 1 is, for example, placed on the moving object M, the position of the air conditioner 1 changes with respect to the condition of the road surface on which the moving object M moves, and the housing 11 and the tank 12 are inclined.

The recovery water sensor 924 for detecting water flowing in the recovery water channel 92 and the controller 130 communicably connected to the recovery water sensor 924, the water supply pump 913, and the recovery pump 923 are provided, and the controller 130 controls the driving of the water supply pump 913 and the recovery pump 923 based on a detection value output from the recovery water sensor 924.

The air conditioner 1 includes the controller 130 configured by, for example, a microcomputer, and the controller 130 controls the driving of the water supply pump 913 and the recovery pump 923 based on a detection value output from the recovery water sensor 924 that detects water flowing through the recovery water channel 92. The vaporization amount of the water supplied from the tank 12 varies depending on the use environment of the air conditioner 1, that is, the temperature and the absolute humidity of the air taken in by the air conditioner 1. The water flowing through the recovery water channel 92 is water remaining in liquid form without being vaporized in the cooling unit 3. Thus, by controlling the driving of the water supply pump 913 and the recovery pump 923 based on the detection value from the recovery water sensor 924, the amount of water to be supplied can be optimized in accordance with the use environment of the air conditioner 1.

The controller 130 stops the water supply pump 913 when the detection value output from the recovery water sensor 924 indicates that the amount of water flowing through the recovery water channel 92 is equal to or greater than a predetermined amount.

The controller 130 may stop the water supply pump 913 when the detection value output from the recovery water sensor 924 indicates that the amount of water flowing through the recovery water channel 92 is equal to or larger than a predetermined amount, and may drive the water supply pump 913 when the detection value indicates that the amount of water flowing through the recovery water channel 92 is smaller than the predetermined amount. By setting the predetermined amount to, for example, 0 [kg/s] as a mass flow rate, the controller 130 can control the stop and drive of the water supply pump 913 based on the presence or absence of water flowing through the recovery water channel 92. The presence of water flowing in the recovery water channel 92 indicates that the water remains in liquid form without being vaporized in the cooling unit 3, and the controller 130 stops the water supply pump 913, thereby preventing the water from being excessively supplied to the cooling unit 3 and improving vaporization efficiency.

The controller 130 performs an intermittent operation by repeating driving and stopping of the water supply pump 913 and the recovery pump 923.

Since the controller 130 performs the intermittent operation by repeating the driving and stopping of the water supply pump 913 and the recovery pump 923, the cooling unit 3 can be prevented from being excessively supplied with water.

The controller 130 performs the drive control of the water supply pump 913 and the recovery pump 923 by providing a predetermined delay time between the drive start time of the water supply pump 913 and the drive start time of the recovery pump 923.

To periodically perform the intermittent operation by repeating the drive and stop of the water supply pump 913 and the recovery pump 923, the controller 130 drives the water supply pump 913 and the recovery pump 923 by providing a predetermined delay time between the drive start time of the water supply pump 913 and the drive start time of the recovery pump 923 in the same cycle. That is, at the time when the water supply pump 913 starts driving, the recovery pump 923 does not start driving, and the recovery pump 923 is stopped. Since the supplied water tends to be absorbed by the first vaporization filter 31 and the second vaporization filter 32 included in the cooling unit 3 for a while after the driving of the water supply pump 913 is started and the supply of water to the cooling unit 3 is started, there is a concern that the recovery pump 923 may run at idle even if driven. In contrast, by providing a predetermined delay time between the driving start time point of the water supply pump 913 and the driving start time point of the recovery pump 923, the recovery pump 923 can be prevented from being unnecessarily driven and thus the power consumption by the recovery pump 923 can be reduced.

The controller 130 controls the driving of the water supply pump 913 and the recovery pump 923 such that the driving time of the recovery pump 923 is longer than the driving time of the water supply pump 913.

By driving the recovery pump 923 longer than the water supply pump 913, the controller 130 can reliably recover the water remaining in the cooling unit 3, reduce the amount of water remaining inside the housing 11, and improve the degree of hygiene inside the housing 11.

The embodiments disclosed herein are illustrative and not restrictive. The scope of the present invention is defined by the appended claims and is intended to include all modifications within the meaning and scope equivalent to the appended claims.

While the disclosure has been described in detail with reference to the specific embodiment thereof, this is merely an example, and various changes, arrangements and modifications may be applied therein without departing from the spirit and scope of the disclosure.

What is claimed is:

1. An air conditioner, comprising:
a housing having a first outlet and a second outlet;
a first channel communicating with the first outlet;
a second channel communicating with the second outlet;
a sensible heat exchanger to exchange sensible heat between a first air flowing through the first channel and a second air flowing through the second channel;
a first vaporization filter to cool the first air by latent heat of water
a second vaporization filter to cool the second air by latent heat of water; and
an L-shaped member disposed between the housing and the first vaporization filter;
wherein the first vaporization filter is disposed downstream of the sensible heat exchanger in a flow direction of the first air,
wherein the second vaporization filter is disposed upstream of the sensible heat exchanger in a flow direction of the second air,
wherein the first vaporization filter and the second vaporization filter are placed on the L-shaped member so as to be arranged in an L-shape, and
wherein the L-shaped member is a drain pan to receive water not vaporized at the first vaporization filter and the second vaporization filter.

2. The air conditioner according to claim 1, wherein the first vaporization filter and the second vaporization filter are fastened in the L-shape by the L-shaped member.

3. The air conditioner according to claim 1, wherein the sensible heat exchanger is housed in the housing such that an inner surface of the housing and an end surface of the sensible heat exchanger facing the inner surface form an acute angle.

4. The air conditioner according to claim 1, wherein
the sensible heat exchanger includes a first path through which the first air flows, and a second path through which the second air flows,
the first vaporization filter covers an exit of the first path, and
the second vaporization filter covers an entrance of the second path.

5. The air conditioner according to claim 4, wherein
the first path and the second path intersect to form a crossflow in the sensible heat exchanger, and
an angle formed between an end surface of the first vaporization filter and an end surface of the second vaporization filter each facing the sensible heat exchanger is greater than or equal to an angle of intersection between the first path and the second path.

6. The air conditioner according to claim 4, wherein the sensible heat exchanger has a first exit opening surface having an exit of the first path, and a surface-to-surface distance between the first exit opening surface of the sensible heat exchanger and an inner surface of the housing facing the first exit opening surface increases downstream in the flow direction of the first air.

7. The air conditioner according to claim 4, wherein
the housing is provided with an inlet through which the first air and the second air are taken in,
the air conditioner further comprises a dust collecting filter disposed between the inlet and the sensible heat exchanger, and
the dust collecting filter is curved to cover an entrance of the first path and the entrance of the second path.

8. The air conditioner according to claim 7, further comprising a seal provided at each end portion of the dust collecting filter.

9. The air conditioner according to claim 7, wherein
a space between the sensible heat exchanger and the inlet is divided into an upstream space and a downstream space in the flow direction of the first air and the flow direction of the second air by the dust collecting filter, and
a branch channel is defined in the downstream space to divide air taken in from the inlet into the first air flowing through the first path and the second air flowing through the second path.

10. The air conditioner according to claim 9, wherein a supply water channel for supplying water to the first vaporization filter and the second vaporization filter is provided in the upstream space.

11. The air conditioner according to claim 1, wherein
the housing is provided with a door portion configured to be openable and closable, on a side surface of the housing to which the first vaporization filter is provided, and
an inner surface of the door portion is provided with a blocking member to block entry of air into the first channel without passing through the first vaporization filter.

12. The air conditioner according to claim 1, further comprising
a tank outside the housing;
a supply water channel to supply water in the tank to the first vaporization filter and the second vaporization filter; and
a recovery channel to recover, into the tank, water not vaporized at the first vaporization filter and the second vaporization filter.

13. The air conditioner according to claim 1, wherein
the housing is provided with a door portion on a side surface of the housing to which the first vaporization filter is provided, and
when the door portion is opened, the first vaporization filter and the second vaporization filter are slidable in the horizontal direction to be attached and detached.

* * * * *